(12) United States Patent
Nishiyama

(10) Patent No.: US 11,436,008 B2
(45) Date of Patent: Sep. 6, 2022

(54) ARITHMETIC PROCESSING DEVICE AND METHOD FOR CONTROLLING ARITHMETIC PROCESSING DEVICE INSTRUCTION EXECUTION TIMING

(71) Applicant: FUJITSU LIMITED, Kawasaki (JP)

(72) Inventor: Ryuichi Nishiyama, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 149 days.

(21) Appl. No.: 16/889,878

(22) Filed: Jun. 2, 2020

(65) Prior Publication Data

US 2020/0409694 A1    Dec. 31, 2020

(30) Foreign Application Priority Data

Jun. 26, 2019 (JP) .............................. JP2019-118414

(51) Int. Cl.
  *G06F 9/30* (2018.01)
  *G06F 9/32* (2018.01)
  (Continued)

(52) U.S. Cl.
  CPC .............. *G06F 9/3001* (2013.01); *G06F 1/12* (2013.01); *G06F 1/14* (2013.01); *G06F 9/321* (2013.01); *G06F 9/4806* (2013.01)

(58) Field of Classification Search
  None
  See application file for complete search history.

(56) References Cited

U.S. PATENT DOCUMENTS 7,607,028 B2 * 10/2009 Douriet ................... G06F 1/26
                                                    713/320
7,937,563 B2 *  5/2011 Naffziger .............. G06F 9/3869
                                                    713/323
(Continued)

FOREIGN PATENT DOCUMENTS

CN      113366410 A  *  9/2021  ........... G06F 1/3243
EP       2637096 A1  *  9/2013  ........... G06F 9/4812
(Continued)

OTHER PUBLICATIONS

'Staggered Core Activation: A Circuit/Architectural Approach for Mitigating Resonant Supply Noise Issues in Multi-core Multi-power Domain Processors' by Ayan Paul et al., Proceedings of the IEEE 2012 Custom Integrated Circuits Conference, CICC2012, San Jose, CA, USA, Sep. 9-12, 2012. (Year: 2012).*

*Primary Examiner* — Steven G Snyder
(74) *Attorney, Agent, or Firm* — Fujitsu Patent Center

(57) ABSTRACT

An arithmetic processing device includes a plurality of arithmetic processing circuitry, each of which includes: an instruction hold circuit configured to hold an arithmetic instruction; an arithmetic circuit configured to execute an arithmetic instruction issued from the instruction hold circuit; and a measurement circuit configured to measure a predetermined time period, wherein the instruction hold circuit is configured to perform first processing after the instruction hold circuit holds a first arithmetic instruction when the arithmetic circuit is not executing other arithmetic instructions, the first processing being configured to: cause the measurement circuit to initiate the measurement of the predetermined time; and issue, in response to a completion of the measurement of the predetermined time period, the held first arithmetic instruction to the arithmetic circuit, and wherein the predetermined time period measured by the (Continued)

measurement circuit is different between at least two of the plurality of arithmetic processing circuitry.

8 Claims, 14 Drawing Sheets

(51) Int. Cl.
*G06F 9/48* (2006.01)
*G06F 1/14* (2006.01)
*G06F 1/12* (2006.01)

(56) References Cited

U.S. PATENT DOCUMENTS

| | | | | |
|---|---|---|---|---|
| 8,046,609 | B2* | 10/2011 | Kawasaki | G06F 1/3237 |
| | | | | 713/300 |
| 8,677,165 | B2* | 3/2014 | Atkinson | G06F 1/26 |
| | | | | 713/323 |
| 9,360,918 | B2* | 6/2016 | Manne | G06F 1/3234 |
| 9,811,150 | B2* | 11/2017 | Allen-Ware | G06F 1/3287 |
| 11,036,273 | B2* | 6/2021 | Lee | G06F 3/0653 |
| 11,112,846 | B2* | 9/2021 | Strach | G06F 1/30 |
| 2007/0002941 | A1* | 1/2007 | Low | G06F 1/12 |
| | | | | 375/229 |
| 2008/0141062 | A1* | 6/2008 | Yamaoka | G06F 1/3203 |
| | | | | 713/501 |
| 2009/0063735 | A1* | 3/2009 | Ng | G06F 9/3824 |
| | | | | 710/54 |
| 2009/0072885 | A1* | 3/2009 | Kawasaki | G06F 1/3237 |
| | | | | 327/519 |
| 2011/0161625 | A1* | 6/2011 | Pechanek | G06F 9/30043 |
| | | | | 712/11 |
| 2012/0166854 | A1* | 6/2012 | Rotem | G06F 1/28 |
| | | | | 713/340 |
| 2012/0185687 | A1* | 7/2012 | Matsumura | G06F 1/3275 |
| | | | | 713/100 |
| 2013/0111254 | A1* | 5/2013 | Takayanagi | G06F 1/189 |
| | | | | 713/401 |
| 2014/0092687 | A1* | 4/2014 | Sundahl | G06F 3/0679 |
| | | | | 365/185.18 |
| 2014/0181554 | A1* | 6/2014 | Manne | G06F 1/3243 |
| | | | | 713/323 |
| 2016/0132096 | A1* | 5/2016 | Allen-Ware | G06F 1/3287 |
| | | | | 713/323 |
| 2019/0212932 | A1* | 7/2019 | Lee | G06F 3/0653 |
| 2019/0317772 | A1* | 10/2019 | Badenhorst | G06F 9/30098 |
| 2020/0150958 | A1* | 5/2020 | Ahmed | G06N 3/0454 |

FOREIGN PATENT DOCUMENTS

| | | | | |
|---|---|---|---|---|
| GB | 2532210 A | * | 5/2016 | G06F 1/3287 |
| JP | H06-035798 A | | 2/1994 | |
| WO | 2006/051612 A1 | | 5/2006 | |
| WO | WO-2012170213 A2 | * | 12/2012 | G06F 1/3296 |

* cited by examiner

ARITHMETIC PROCESSING DEVICE AND METHOD FOR CONTROLLING ARITHMETIC PROCESSING DEVICE INSTRUCTION EXECUTION TIMING

CROSS-REFERENCE TO RELATED APPLICATION

This application is based upon and claims the benefit of priority of the prior Japanese Patent Application No. 2019-118414, filed on Jun. 26, 2019, the entire contents of which are incorporated herein by reference.

FIELD

The present invention is related to an arithmetic processing device and a method for controlling an arithmetic processing device.

BACKGROUND

In a semiconductor integrated circuit, the larger the number of circuits that operate at a time, the more likely the power supply noise will occur. For example, higher-bit groups and lower-bit groups of a plurality of memory circuits are coupled via mutually different pieces of data buffer large-scale integration (LSI) to data buses, reducing simultaneous switching noise of the data buffer LSI. In the case of initiating the supply of clocks to a plurality of circuit modules that operate in synchronization with the clocks, the magnitude of an inrush current generated in the circuit modules is reduced by staggering timings to initiate the supply of docks. This inhibits a voltage drop.

Examples of the related art include Japanese Laid-open Patent Publication No. 6-35798 and International Publication Pamphlet No. WO 2006/51612.

SUMMARY

According to an aspect of the embodiments, an arithmetic processing device includes a plurality of arithmetic processing circuitry, each of which includes: an instruction hold circuit configured to hold an arithmetic instruction; an arithmetic circuit configured to execute an arithmetic instruction issued from the instruction hold circuit; and a measurement circuit configured to measure a predetermined time period, wherein the instruction hold circuit is configured to perform first processing after the instruction hold circuit holds a first arithmetic instruction when the arithmetic circuit is not executing other arithmetic instructions, the first processing being configured to: cause the measurement circuit to initiate the measurement of the predetermined time; and issue, in response to a completion of the measurement of the predetermined time period, the held first arithmetic instruction to the arithmetic circuit, and wherein the predetermined time period measured by the measurement circuit is differ between at least two of the plurality of arithmetic processing circuitry.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENT(S)

In arithmetic processing devices such as a central processing unit (CPU) and a graphics processing unit (GPU), when a plurality of processing cores simultaneously start operations, simultaneous switching noise (power supply noise) occurs. Recently, the trend is toward an increase in the number of processing cores and in the number of operators mounted on an arithmetic processing device in order to improve the processing performance. Thus, the trend is toward an increase in simultaneous switching noise. To reduce malfunctions of an arithmetic processing device caused by simultaneous switching noise, for example, it is conceivable to decrease the operating frequency to ensure an operating margin. However, ire this case, the execution efficiency of arithmetic instructions decreases.

In one aspect, provided is a solution to reduce simultaneous switching noise of an arithmetic processing device including a plurality of processing cores to alleviate a decrease in execution efficiency of arithmetic instructions.

Hereinafter, the embodiments will be described with reference to the drawings.

Figure 1:
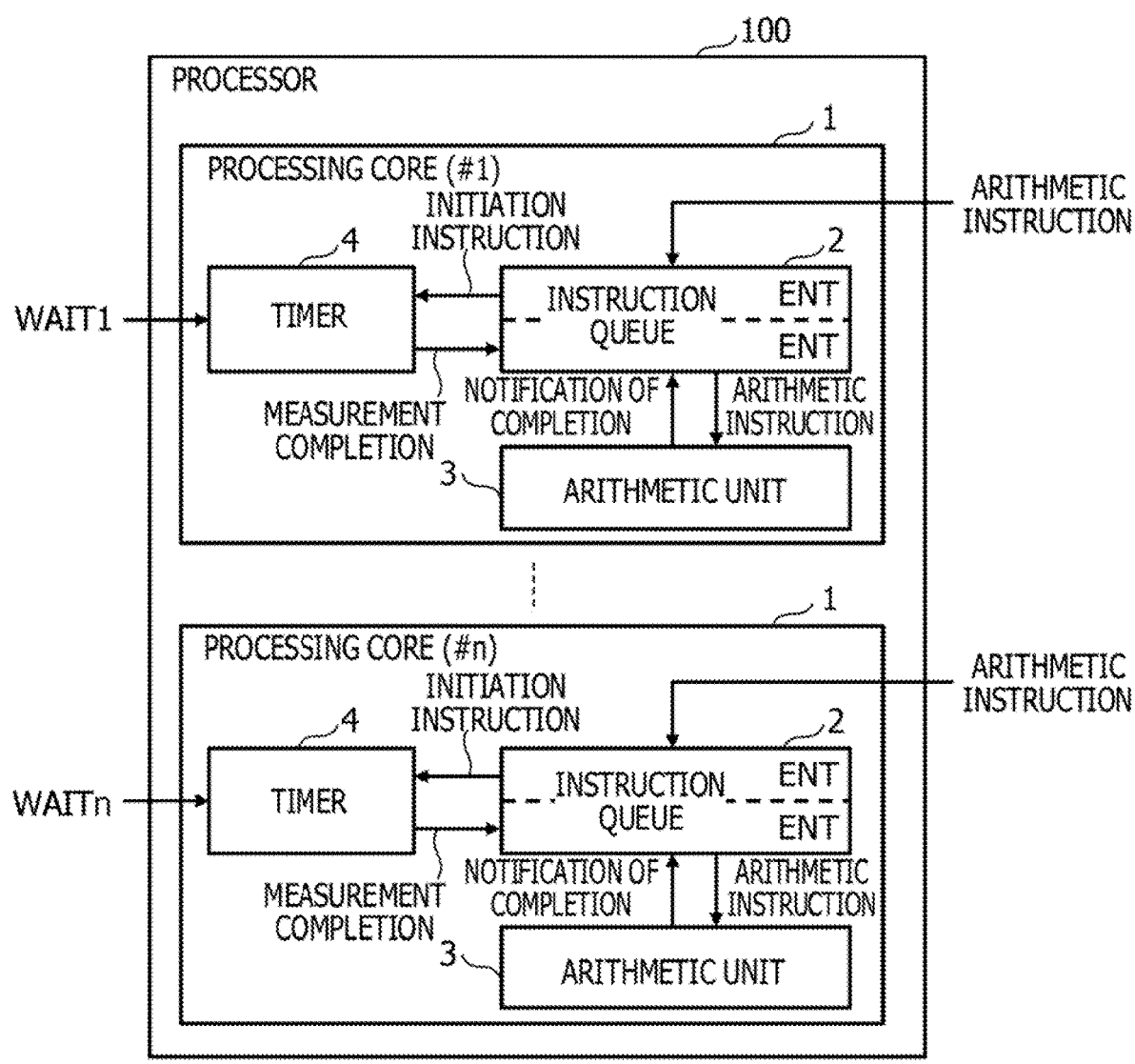
FIG. 1 is a block diagram illustrating an example of a processor in an embodiment.

FIG. 1 illustrates an example of a processor 100 in an embodiment. The processor 100 is a CPU, a GPU, a digital signal processor (DSP), or the like and includes n processing cores 1 (identification numbers #1, . . . , #n) that execute arithmetic instructions. For example, the processor 100 is multi-core LSI. The processor 100 is an example of an arithmetic processing device, and the processing core 1 is an example of an arithmetic processing unit. The processor 100 may have a function of executing a single instruction multiple data (SIMD) arithmetic instruction. The processor 100 may be a dedicated processor used for learning or inference of image processing and the like in neural networks.

Each processing core 1 includes an instruction queue 2 that holds an arithmetic instruction, an arithmetic unit 3 that executes an arithmetic instruction issued from the instruction queue 2, and a timer 4 that measures a predetermined time period. The instruction queue 2 is an example of an instruction hold unit and the timer 4 is an example of a measurement unit. For example, the processing cores 1 have configurations identical to one another and may execute arithmetic instructions in parallel. Hereinafter, when the processing cores 1 are discriminated from one another, they may be referred to using identification numbers with #, such as the processing core #1.

The instruction queue 2 contains, for example, two entries ENT for holding arithmetic instructions. When there is a free entry ENT, the instruction queue 2 stores an arithmetic instruction supplied from the outside of the processor 100 in this entry ENT. The number of entries ENT contained in the instruction queue 2 may be a number other than two.

If an arithmetic instruction is stored in one of the entries ENT when all of the entries ENT are free, the instruction queue 2 issues an instruction to initiate the timer 4 to the timer 4. In this case, based on receiving a notification of measurement completion from the timer 4, the instruction queue 2 issues the arithmetic instruction held in the entry ENT to the arithmetic unit 3.

When the instruction queue 2 receives, from the arithmetic unit 3, a completion notification indicating that execution of an arithmetic instruction held in the entry ENT is complete, the instruction queue 2 discards the arithmetic instruction held in the entry ENT. Therefore, when an arithmetic instruction is stored in any of the entries ENT of the instruction queue 2, except when the timer 4 is counting, it is indicated that the arithmetic instruction is being executed by the arithmetic unit 3.

When an arithmetic instruction is held in any of the entries ENT, the instruction queue 2 will not initiate the timer 50 if an arithmetic instruction is stored in another entry ENT that is free. After an arithmetic instruction executed by the arithmetic unit 3 is complete, the instruction queue 2 issues the arithmetic instruction held in the entry ENT to the arithmetic unit 3.

The arithmetic unit 3 includes an operator that executes an arithmetic instruction issued from the instruction queue 2. When execution of an arithmetic instruction is complete, the arithmetic unit 3 outputs a notification of the completion to the instruction queue 2. The number of operators included in the arithmetic unit 3 is not limited to one and may be two or more. In cases where the arithmetic unit 3 includes a plurality of operators, the operators may be of one type or two or more types. Examples of the type of an operator include a floating-point operator, a fixed-point operator, and a logic operator. Examples of the types of a floating-point operator and a fixed-point operator include an adder, a multiplier, a divider, and a product-sum operator.

For example, the timer 4 includes a counter that operates in synchronization with a clock (not illustrated). The timer 4 starts a counting operation based on an initiation instruction from the instruction queue 2, and outputs a notification of measurement completion to the instruction queue 2 when the value of the counter is updated by a wait value WAIT (any wait value of WAIT1 to WAITn). For example, the wait value WAIT counted by the timer 4 is set to a value suitable for the processing core 1, not a value common to all the processing cores 10.

In the example illustrated in FIG. 1, the timers 4 operate using the wait values WAIT set to the same values as the values of the identification numbers #1 to #n of the respective processing cores 1. In the example illustrated in FIG. 1, the timer 4 of the processing core 1 (#1) performs a counting operation using the wait value WAIT1, and the timer 4 of the processing core 1 (#n) performs a counting operation using the wait value WAITn.

The timer 4 may include a register that holds the wait value WAIT. The timer 4 may be an incrementer that repeats a counting operation until the counter value of "0" reaches the wait value WAIT, or may be a decrementer that repeats a counting operation until the counter value of the wait value WAIT reaches "0".

Figure 2:
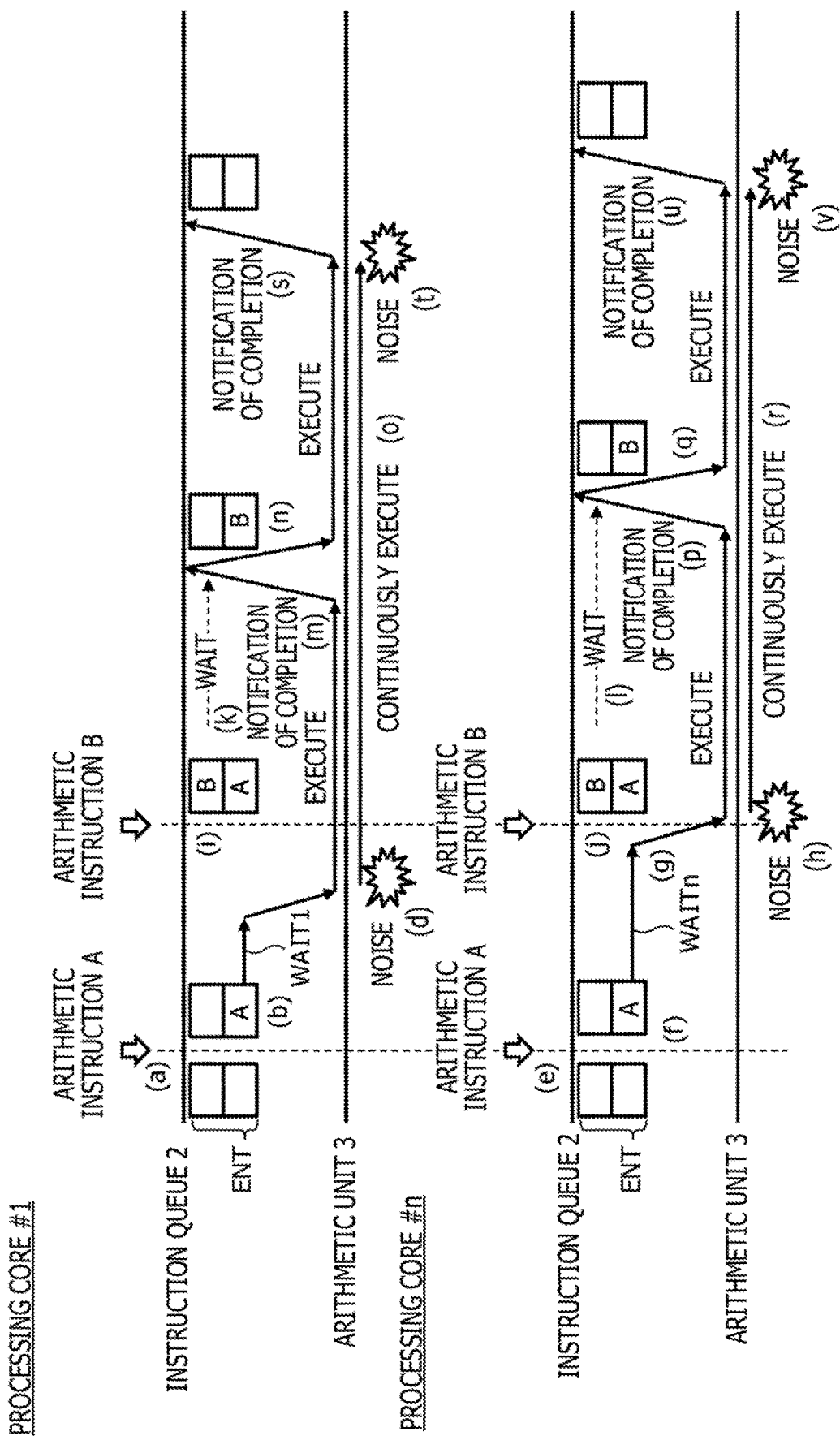
FIG. 2 is an explanatory diagram illustrating an example of operations of the processor illustrated in FIG. 1.

FIG. 2 illustrates an example of operations of the processor 100 illustrated in FIG. 1. For example, FIG. 2 illustrates an example of a method for controlling the processor 100. For clarity of description, FIG. 2 illustrates the operations of two processing cores #1 and #n. In FIG. 2, the processing cores #1 and #n receive arithmetic instructions A at the same timing and then receives arithmetic instructions B at the same timing. For example, the arithmetic instructions A received by the processing cores #1 and #n are identical arithmetic instructions but may be arithmetic instructions of different types. Similarly, the arithmetic instructions B received by the processing cores #1 and #n are identical arithmetic instructions but may be arithmetic instructions of different types.

At the time of start of operations illustrated in FIG. 2, the instruction queue 2 of each of the processing cores #1 and #n is in an empty state. When the instruction queue 2 of the processing core #1 receives the arithmetic instruction A, the instruction queue 2 stores the arithmetic instruction A in a free entry ENT and initiates the timer 4 ((a) and (b) of FIG. 2). The timer 4 measures a predetermined time period corresponding to the wait value WAIT1 and, based on the passage of the predetermined time period, notifies the instruction queue 2 that the measurement is complete, Based on the notification of measurement completion, the instruction queue 2 issues the held arithmetic instruction A to the arithmetic unit 3 ((c) of FIG. 2). The arithmetic unit 3 executes the issued arithmetic instruction A. Upon the start of execution of an arithmetic instruction performed by the arithmetic unit 3, for example, a current flowing through a power supply line suddenly increases, causing switching noise to occur ((d) of FIG. 2).

When the instruction queue 2 of the processing core #n receives the arithmetic instruction A, as in the processing core #1, the instruction queue 2 stores the arithmetic instruction A in a free entry ENT and initiates the timer 4 ((e) and (f) of FIG. 2). The timer 4 measures a predetermined time period corresponding to the wait value WAITn and, based on the passage of the predetermined time period, notifies the instruction queue 2 that the measurement is complete. Based on the notification of measurement completion, the instruction queue 2 issues the held arithmetic instruction A to the arithmetic unit 3 ((g) of FIG. 2).

The predetermined time period corresponding to the wait value WAITn is longer than the predetermined time period corresponding to the wait value WAIT1. Therefore, after the processing core #1 starts execution of the arithmetic instruction A, the arithmetic unit 3 of the processing core #n receives the arithmetic instruction A and starts execution of the arithmetic instruction A. Upon the start of execution of the arithmetic instruction A performed by the arithmetic unit 3 of the processing core #n, switching noise occurs ((h) of FIG. 2).

However, the processing cores #1 and #n differ from each other in the timing to start execution of the arithmetic instruction A performed by the arithmetic unit 3. This may inhibit superposition of switching noise. At the time of start of execution of the arithmetic instruction A performed by the processing core #n, the processing core #1 is executing the arithmetic instruction A, consuming the power supply current. Therefore, the switching noise is mitigated compared with when the processing core #1 is not executing the arithmetic instruction A.

While executing the arithmetic instructions A, the processing cores #1 and #n receive arithmetic instructions B. Each of the instruction queues 2 of the processing cores #1 and #n contains one free entry ENT and therefore stores the received arithmetic instruction B in the free entry ENT ((i) and (j) of FIG. 2), Since the arithmetic units 3 of the processing cores #1 and #n are executing the arithmetic instructions A, each of the instruction queues 2 of the processing cores #1 and #n waits for issuance of an arithmetic instruction to the arithmetic unit 3 until execution of the arithmetic instruction A is complete ((k) and (l) of FIG. 2). The instruction queue 2 contains a plurality of entries ENT and therefore may receive a new arithmetic instruction and store the received arithmetic instruction in the entry ENT even while the arithmetic unit 3 is executing an arithmetic instruction.

Based on completion of execution of the arithmetic instruction A, the arithmetic unit 3 of the processing core #1 issues a notification of the completion to the instruction queue 2 ((m) of FIG. 2). Based on receiving the notification of completion of the arithmetic instruction A from the arithmetic unit 3, the instruction queue 2 of the processing core #1 discards the arithmetic instruction A held in the entry ENT and issues the arithmetic instruction B to the arithmetic unit 3 without initiating the timer 4 ((n) of FIG. 2). In such a manner, when an arithmetic instruction is stored in the entry ENT while an arithmetic instruction is being executed, the instruction queue 2 issues the arithmetic instruction to the arithmetic unit 3 without initiating the timer 4.

For example, the instruction queue 2 determines that an arithmetic instruction is being executed, during the time period from issuance of the arithmetic instruction to the arithmetic unit 3 to receipt of a notification of completion. If, while an arithmetic instruction is being executed, a new arithmetic instruction is received, a predetermined current continues to flow through the power supply line due to continuous execution of the arithmetic instructions without initiation of the timer 4. Therefore, the occurrence of switching noise may be inhibited ((o) of FIG. 2).

Based on completion of execution of the arithmetic instruction A, the arithmetic unit 3 of the processing core #n issues a notification of the completion to the instruction queue 2 ((p) of FIG. 2). Based on receiving the notification of completion of the arithmetic instruction A from the arithmetic unit 3, the instruction queue 2 of the processing core #n discards the arithmetic instruction A held in the entry ENT and issues the arithmetic instruction B to the arithmetic unit 3 without initiating the timer 4 ((q) of FIG. 2). In the processing core #n, if, while an arithmetic instruction is being executed, a new arithmetic instruction is received, the occurrence of switching noise may be inhibited by continuous execution of the arithmetic instructions without initiation of the timer 4. ((r) of FIG. 2).

After completing execution of the arithmetic instruction B, the arithmetic unit 3 of the processing core #1 issues a notification of the completion to the instruction queue 2 ((s) of FIG. 2). A new arithmetic instruction to be executed is not contained in the instruction queue 2 of the processing core #1, and therefore the processing core #1 will not execute an arithmetic instruction thereafter. Since the current consumed by the arithmetic unit 3 of the processing core #1 suddenly decreases, switching noise occurs in the processing core #1 upon completion of execution of the arithmetic instruction B performed by the arithmetic unit 3 ((t) of FIG. 2). At the time of completion of execution of the arithmetic instruction B performed by the processing core #1, the processing core #n is executing the arithmetic instruction B, consuming the power supply current. Therefore, the switching noise is mitigated compared with when the processing core #n is not executing the arithmetic instruction B.

After completing execution of the arithmetic instruction B, the arithmetic unit 3 of the processing core #n issues a notification of the completion to the instruction queue 2 ((u) of FIG. 2). A new arithmetic instruction to be executed is not contained in the instruction queue 2 of the processing core #n, and therefore the processing core #n will not execute an arithmetic instruction thereafter. Since the current consumed by the arithmetic unit 3 of the processing core #n suddenly decreases, switching noise occurs in the processing core #n upon completion of execution of the arithmetic instruction B performed by the arithmetic unit 3 ((v) of FIG. 2). However, the timings to start execution of the arithmetic instructions B performed by the arithmetic units 3 differ from each other between the processing cores #1 and #n. This may inhibit superposition of switching noise. In such a manner, the execution timings of a common arithmetic instruction supplied to a plurality of processing cores # at the same timing are staggered from each other. This may inhibit superposition of switching noise, which may reduce simultaneous switching noise.

Even when the start of execution of an arithmetic instruction in the arithmetic unit 3 is delayed, the delay in the execution of the initial arithmetic instruction only results in a delay in the execution of the subsequent arithmetic instruction. The arithmetic instruction is executed in parallel in a plurality of processing cores #1 and #n. The delay in the execution of an arithmetic instruction will not steadily increases. Therefore, even when the start of execution of an arithmetic instruction is delayed, there is little decrease in the execution efficiency (throughput) of the arithmetic instruction. Therefore, in a benchmark test, there is little degradation in the performance.

For example, when the occurrence of switching noise causes a decrease in power supply voltage or an increase in ground voltage, the circuit operations may be slowed. Therefore, in the timing design (power supply design) of the processor 100, an excessive timing margin is set so that a signal may be latched even when the largest switching noise that may be assumed has occurred. When a timing design that takes switching noise into account leads to a decrease in the maximum operating frequency of the processor 100, the processing performance of the processor 100 is degraded.

In contrast, in this embodiment, since superposition of switching noise (power supply noise) may be inhibited, the largest switching noise that may be assumed may be decreased. Thus, an excessive timing margin may not be set in a timing design. This may reduce the design margin of a power supply design. As a result, a decrease in the maximum operating frequency of the processor 100 due to power supply noise may be inhibited, and the degradation in the processing performance of the processor 100 may be inhibited.

The arithmetic instructions supplied at the same timing to a plurality of processing cores # may not be a common arithmetic instruction. The supply timing at which an arithmetic instruction is supplied commonly to a predetermined number of processing cores # and the supply timing at which another arithmetic instruction is supplied commonly to a predetermined number of other processing cores # may be the same.

Figure 3:
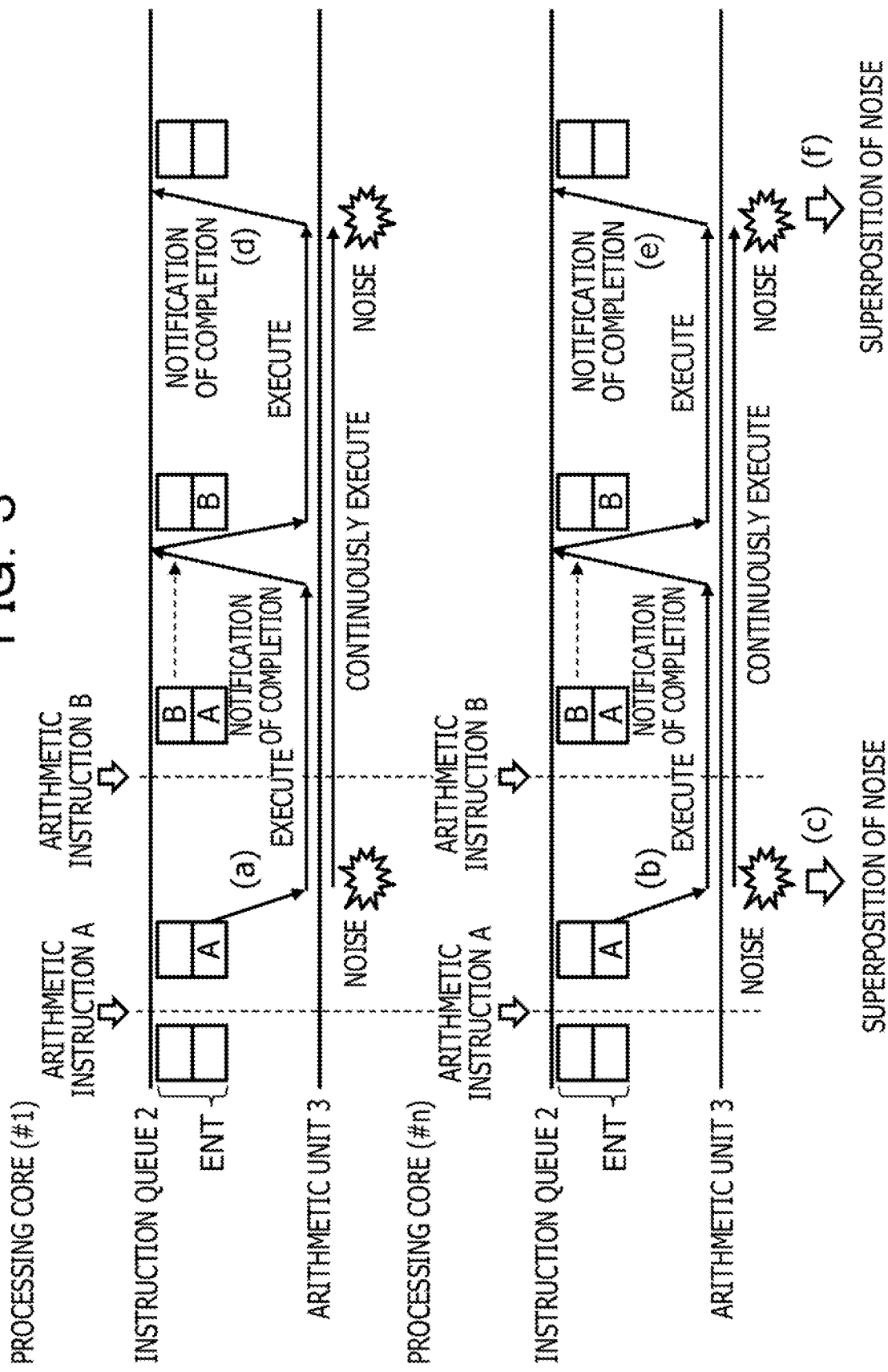
FIG. 3 is an explanatory diagram illustrating an example (comparison example) of operations of another processor.

FIG. 3 illustrates an example (comparison example) of operations of another processor. Detailed description is omitted of the operations similar to or the same as those illustrated in FIG. 2. In the example illustrated in FIG. 3, each of the processing cores #1 and #n does not include the timer 4. Therefore, when the processing cores #1 and #n receive a common arithmetic instruction A in the case where all the entries ENT of the instruction queue 2 are free, the processing core #1 and #n issue the respective arithmetic instructions A to the arithmetic units 3 at the same timing ((a) and (b) of FIG. 3). Thus, the arithmetic units 3 of the processing cores #1 and #n start execution of the arithmetic instructions A at the same timing, and therefore there is superposition of switching noise ((c) of FIG. 3).

Operations after receipt of the arithmetic instructions B are similar to or the same as the operations illustrated in FIG. 2, except that the processing cores #1 and #n execute the arithmetic instructions B at the same timing. The arithmetic units 3 of the processing cores #1 and #n complete execution of the arithmetic instructions B at approximately the same timing and issue notifications of the completion to the instruction queues 2 ((d) and (e) of FIG. 3). Thus, switching noise occurs at approximately the same timing in the processing cores #1 and #n, resulting in superposition of switching noise ((f) of FIG. 3).

Figure 4:
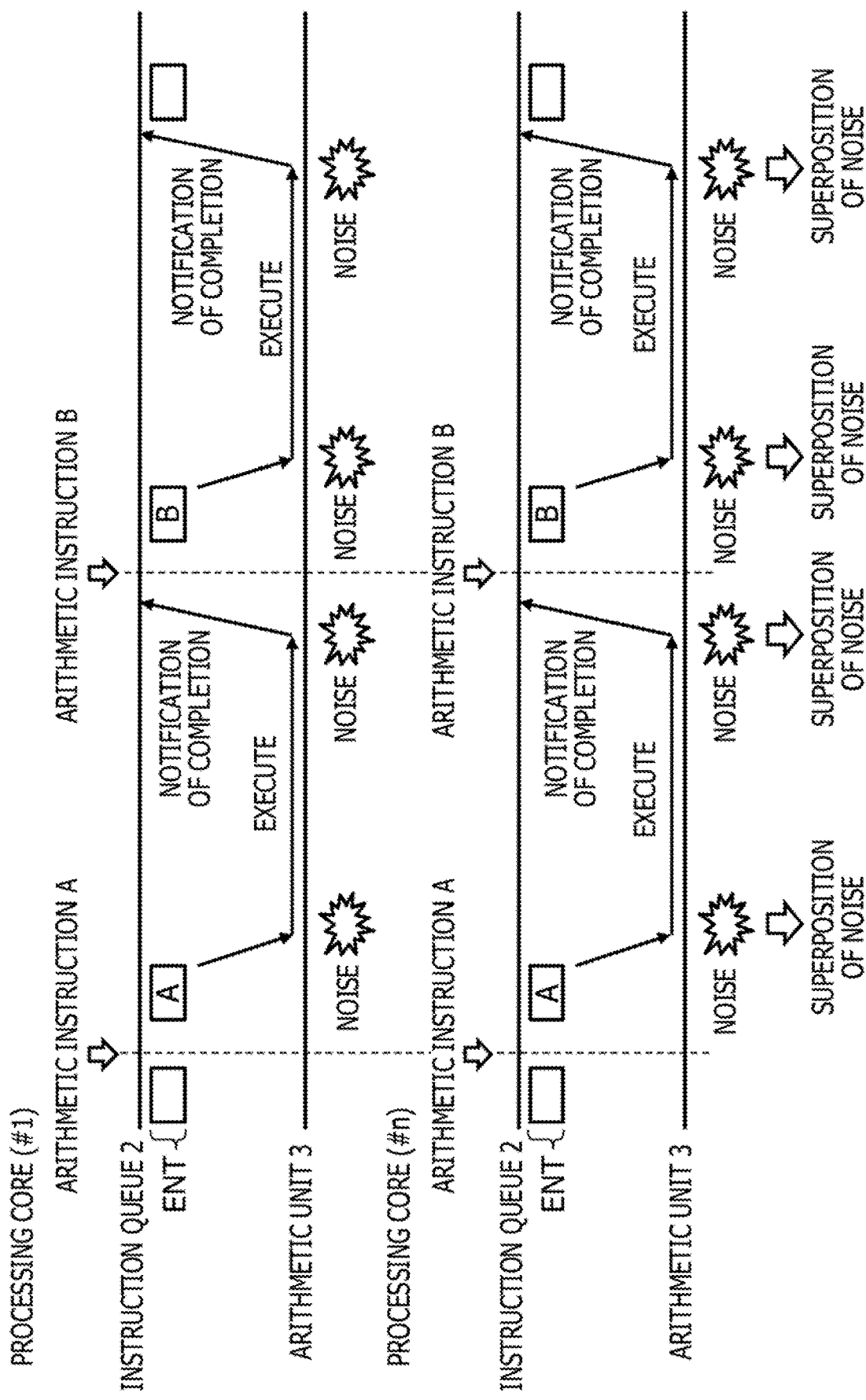
FIG. 4 is an explanatory diagram illustrating another example (comparison example) of operations of the other processor.

FIG. 4 illustrates an example (comparison example) of operations of the other processor. Detailed description is omitted of the operations similar to or the same as those illustrated in FIG. 2 and FIG. 3. In the example illustrated in FIG. 4, each of the processing cores #1 and #n does not include the timer 4, and the instruction queue 2 has only one entry ENT. In the case of only one entry ENT, before execution of an arithmetic instruction performed by the arithmetic unit 3 is complete, the instruction queue 2 is unable to store the next arithmetic instruction in the entry ENT. Therefore, each of the processing cores #1 and #n is unable to continuously execute the arithmetic instructions A and B. Switching noise occurs at the start time and the completion time of the operation of each of the arithmetic instructions A and B, resulting in superposition of the occurred switching noise.

As described above, in the embodiment illustrated in FIG. 1 and FIG. 2, the timers 4 whose measurement time periods are different are used for the respective processing cores 1, so that the timings to start execution of arithmetic instructions received at the same timing are staggered among the arithmetic units 3. Thus, switching noise that occurs when the arithmetic unit 3 starts to execute an arithmetic instruction may be inhibited from superposition. Simultaneous switching noise may be reduced and therefore a timing design may be made without setting an excessive timing margin. This may reduce the design margin of a power supply design. Thus, a decrease in the maximum operating frequency of the processor 100 due to power supply noise may be inhibited, and the degradation in the processing performance of the processor 100 may be inhibited.

In the case where an arithmetic instruction that has not been executed is held in the instruction queue 2, the arithmetic instruction that has not been executed is issued to the arithmetic unit 3 based on completion of an arithmetic instruction that is being executed, so that arithmetic instructions may be continuously executed. This may inhibit switching noise from occurring at each start of execution of an arithmetic instruction and at each completion of the arithmetic instruction as illustrated in FIG. 4, and may inhibit a decrease in the operating margin of the processor 100.

The instruction queue 2 contains a plurality of entries ENT and therefore may receive a new arithmetic instruction and store the received arithmetic instruction in the entry ENT even while the arithmetic unit 3 is executing an arithmetic instruction.

Figure 5:
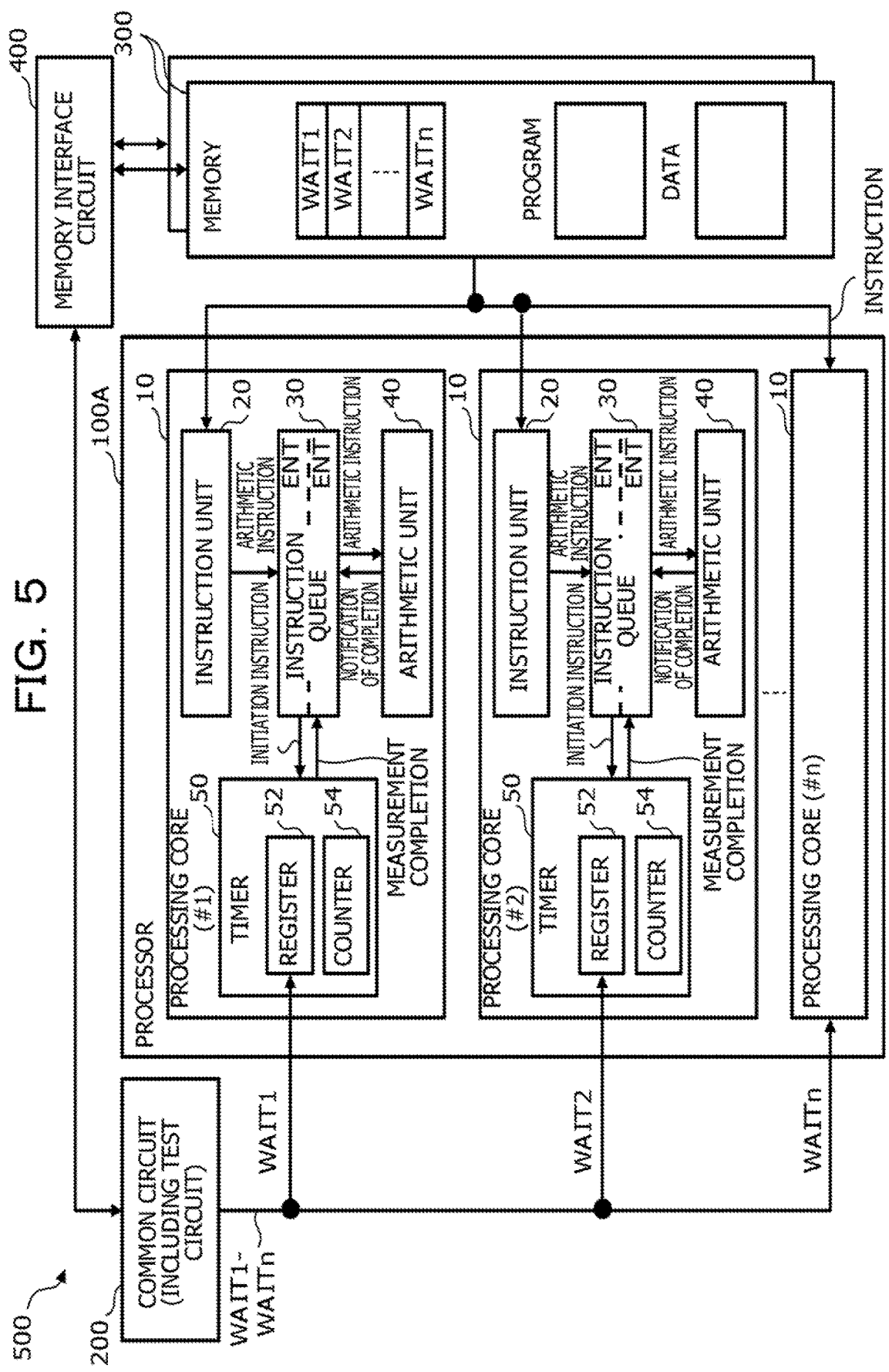
FIG. 5 is a block diagram illustrating an example of a system including a processor in another embodiment.

FIG. 5 illustrates an example of a system 500 including a processor 100A in another embodiment. Detailed description is omitted of the components similar to or the same as those illustrated in FIG. 1. The system 500 includes the processor 100A, a common circuit 200, memories 300, and a memory interface circuit 400. For example, the processor 100A, the common circuit 200, the memories 300, and the memory interface circuit 400 are mounted on a system substrate. The processor 100A, the common circuit 200, and the memory interface circuit 400 may be included as a system on a chip (SoC) in one semiconductor chip. The processor 100A is an example of the arithmetic processing device. For example, the system 500 is a computer such as a server or a main frame.

For example, the processor 100A, like the processor 100 illustrated in FIG. 1, includes n processing cores 10 (identification numbers #1, #2, . . . , #n). The processor 100A has a configuration and functions similar to or the same as those of the processor 100 illustrated in FIG. 1, except that each processing core 10 includes an instruction unit 20. The processor 100A is an example of the arithmetic processing device.

Each processing core 10 includes the instruction unit 20, an instruction queue 30, an arithmetic unit 40, and a timer 50. The processing cores 10 have configurations identical to one another and may execute arithmetic instructions in parallel. The processing core 10 is an example of the arithmetic processing unit, the instruction queue 30 is an example of the instruction hold unit, and the timer 50 is an example of the measurement unit.

The instruction unit 20 causes an arithmetic instruction supplied from the memory 300 to be stored in the instruction queue 30, thereby issuing an instruction to execute the arithmetic instruction. The instruction unit 20 may include an instruction decoder that decodes an arithmetic instruction supplied from the memory 300.

Except for receiving an arithmetic instruction via the instruction unit 20, the instruction queue 30 has a configuration and functions similar to or the same as those of the instruction queue 2 illustrated in FIG. 1. The arithmetic unit 40 has a configuration and functions similar to or the same as those of the arithmetic unit 3 illustrated in FIG. 1. For example, the number of and the number of types of operators included in the arithmetic unit 40 are not limited to one and may be two or more.

The timer 50 has a configuration and functions similar to or the same as those of the timer 4 illustrated in FIG. 1. For example, the timer 50 includes a register 52 that stores the wait value WAIT corresponding to a predetermined time period as a counter value, and a counter 54. The register 52 is an example of a storage unit.

Based on an initiation instruction from the instruction queue 30, the timer 50 causes the counter 54 to count a counter value stored in the register 52. For example, the counter 54 performs a counting operation in synchronization with a clock signal. Based on counting of a counter value performed by the counter 54, the timer 50 completes measurement of a predetermined time period corresponding to the wait value WAIT and outputs a notification of measurement completion to the instruction queue 30. By measuring a predetermined time period by using the register 52 and the counter 54 provided in the timer 50, for example, the predetermined time period may be measured using clock signals used in the processor 100A.

The common circuit 200 is a circuit common to a plurality of processing cores 10 and may include a test circuit, such as a built-in self test (BIST), that performs a test of the processor 100A. For example, the common circuit 200 has a function of setting initial values for a control register and the like included in the processor 100A and the like. The common circuit 200 reads the respective wait values WAIT (WAIT1, WAIT2, . . . , WAITn) of the processing cores 10 held in the memory 300 via the memory interface circuit 400. The common circuit 200 causes the read wait value WAIT to be stored in the register 52 in the timer 50 of each processing core 10.

When the test circuit in the common circuit 200 performs a test using a scan chain, the common circuit 200 may use the scan chain to cause the wait values WAIT to be stored in the registers 52 of the timers 50 of the processing cores 10.

The memory interface circuit 400 controls input and output of data between the common circuit 200 and the memories 300. The memory 300 is, for example, a memory module including a synchronous dynamic random-access memory (SDRAM) and the like. The memory 300 includes a storage area for storing the wait value WAIT corresponding to the processing core 10, a storage area for storing a program (for example, an instruction group including arithmetic instructions) executed by the processor 100A, and a storage area for storing data used for a program and the like. The memory 300 may be a static random-access memory (SRAM), a flash memory, a read-only memory (ROM), or the like. A plurality of types of memories 300 may be mounted on the system 500. The number of memories 300 mounted in the system 500 is not limited to two.

Figure 6:
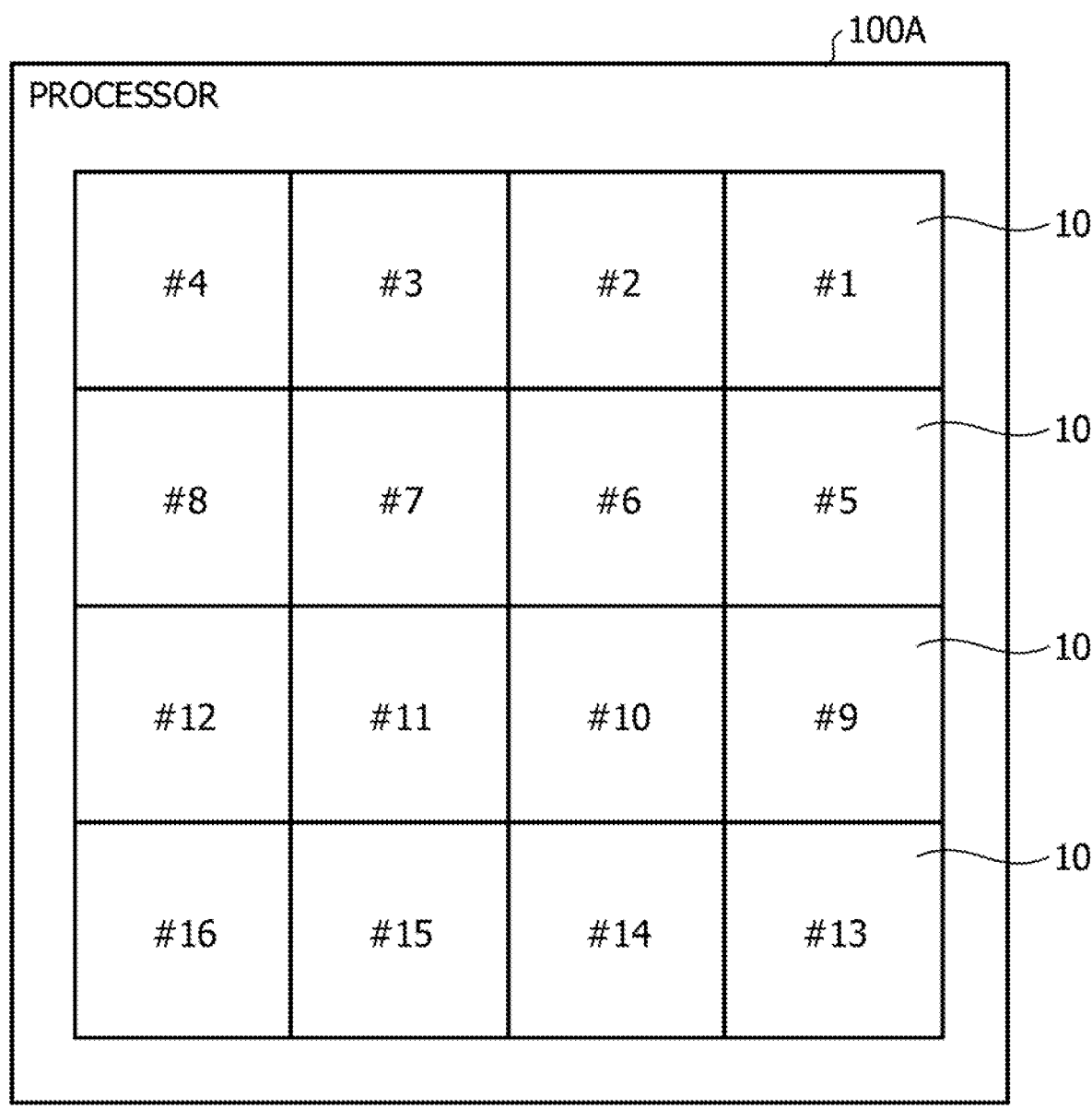
FIG. 6 is a block diagram illustrating an example of arrangement of processing cores of the processor illustrated in FIG. 5.

FIG. 6 illustrates an example of arrangement of the processing cores 10 of the processor 100A illustrated in FIG. 5. For example, the processor 100A includes 16 processing cores 10 (#1 to #16: n=16) arranged such that four processing cores 10 are aligned in the horizontal direction and four processing cores 10 are aligned in the vertical direction. For example, the processing cores #1 to #16 are arranged in a matrix. In FIG. 6, the identification number with # increases in the leftward direction from the top right and increases from the too downward. However, the order in which the identification numbers with # are arranged is not limited to the example illustrated in FIG. 6.

Figure 7:
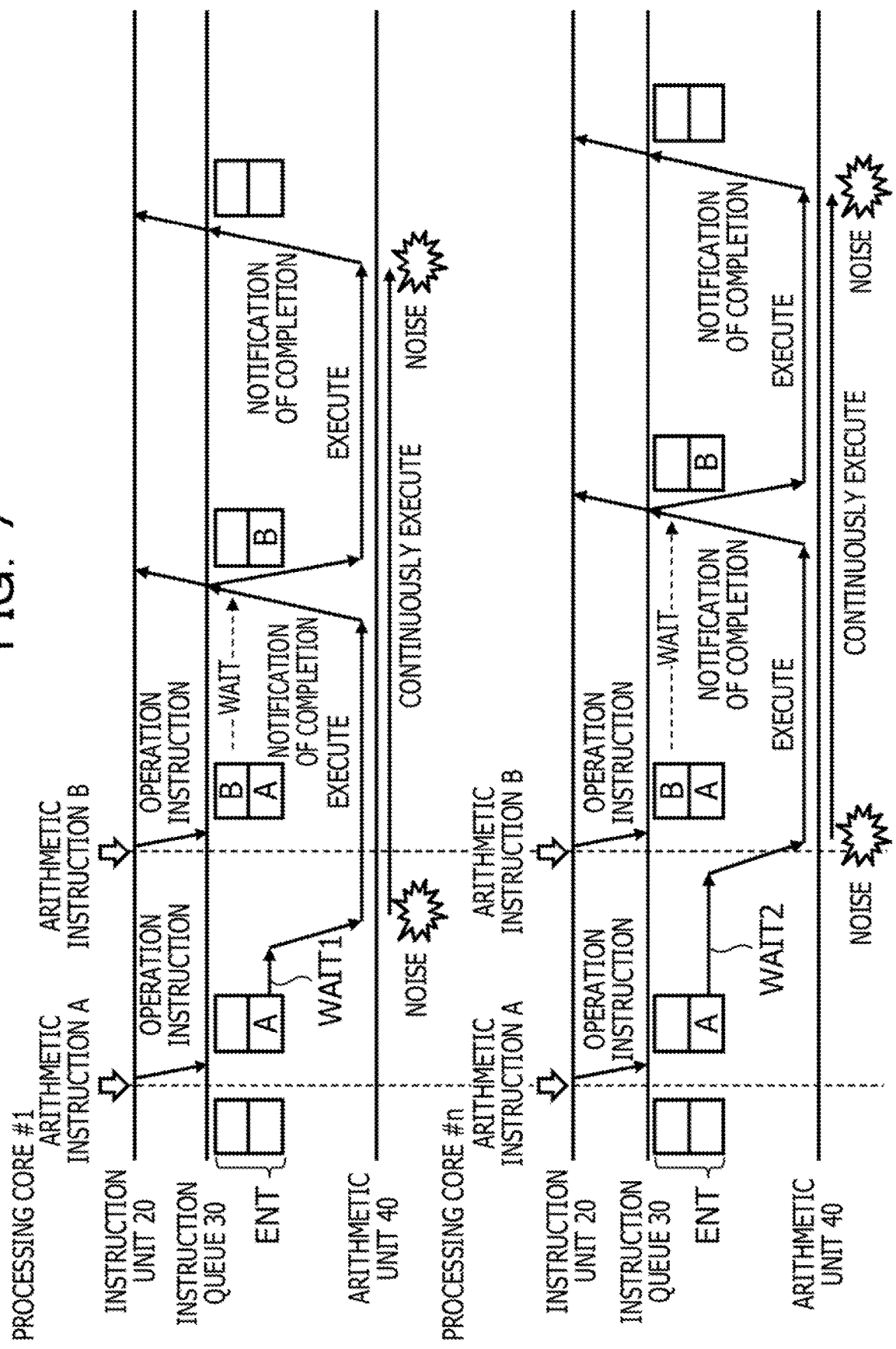
FIG. 7 is an explanatory diagram illustrating an example of operations of the processor illustrated in FIG. 5.

FIG. 7 illustrates an example of operations of the processor 100A illustrated in FIG. 5. For example, FIG. 7 illustrates an example of a method for controlling the processor 100A. Detailed description is omitted of the operations similar to or the same as those illustrated in FIG. 2. The operations illustrated in FIG. 7 are similar to or the same as those illustrated in FIG. 2, except that the operations of the instruction units 20 are added. For example, the operations of the instruction queue 30 are similar to or the same as those of the instruction queue 2 in FIG. 2, the operations of the timer 50 are similar to or the same as those of the timer 4 in FIG. 2, and the operations of the arithmetic unit 40 are similar to or the same as those of the arithmetic unit 3 in FIG. 2.

When an arithmetic instruction is received and when there is a free entry ENT in the instruction queue 30, the instruction unit 20 causes the arithmetic instruction A to be stored in the free entry ENT, thereby instructing the instruction queue 30 to perform an operation. When an arithmetic instruction is received and when there is no free entry ENT in the instruction queue 30, the instruction unit 20 holds the received arithmetic instruction and inhibits receipt of a new arithmetic instruction. When the instruction unit 20 holds an arithmetic instruction, the instruction unit 20 inhibits receipt of a new arithmetic instruction. When there is no free entry ENT in the instruction queue 30, the instruction unit 20 may inhibit receipt of a new arithmetic instruction.

In FIG. 7, the arithmetic instructions A and B supplied to the processing cores #1 and #n are similar to or the same as the arithmetic instructions A and B supplied to the processing cores #1 and #n illustrated in FIG. 2, and the supply timings of the arithmetic instructions A and B are similar to or the same as those in FIG. 2. This may disperse switching noise occurring in the processing cores #1 and #n and may inhibit superposition of the switching noise. Thus, effects similar to or the same as those described with reference to FIG. 2 may be achieved.

Figure 8:
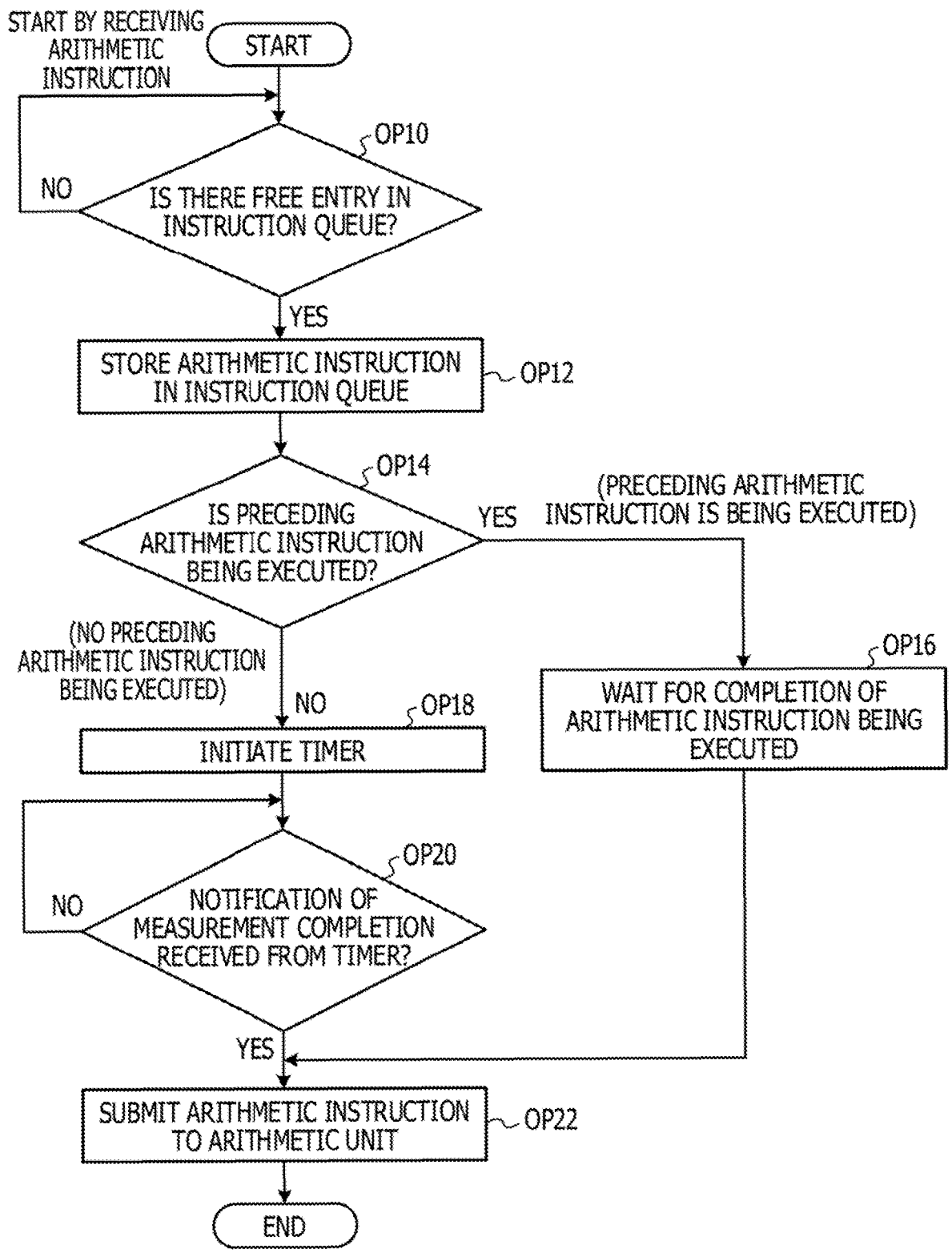
FIG. 8 is a flow diagram illustrating an example of operations from receipt of an arithmetic instruction to start of execution of the arithmetic instruction in the processing core illustrated in FIG. 5.

FIG. 8 illustrates an example of operations from receipt of an arithmetic instruction to start of execution of the arithmetic instruction in the processing core 10 illustrated in FIG. 5. For example, FIG. 8 illustrates an example of a method for controlling the processor 100A. The operations illustrated in FIG. 8 start based on the fact that the instruction unit 20 receives an arithmetic instruction. The operation flow illustrated in FIG. 8 is executed in the processing cores 10 independently from each other in the processor 100A.

First, in operation OP10, the instruction unit 20 determines whether there is a free entry ENT for storing the received arithmetic instruction in the instruction queue 30. If there is no free entry ENT, the instruction unit 20 holds the received arithmetic instruction and waits until the entry ENT becomes free.

If it is determined in operation OP10 that there is a free entry ENT, in operation OP12, the instruction unit 20 causes the arithmetic instruction to be stored in the free entry ENT of the instruction queue 30. Next, in operation OP14, the instruction queue 30 determines whether the arithmetic unit 40 is executing another arithmetic instruction (the preceding arithmetic instruction) other than the arithmetic instruction stored in the entry ENT in operation OP12. Whether the preceding arithmetic instruction is being executed is determined by determining whether after the arithmetic instruction is issued to the arithmetic unit 40, a notification of the completion is received, as described with reference to FIG. 2.

If the preceding arithmetic instruction is being executed, in operation OP16, the instruction queue 30 waits for completion of the arithmetic instruction being executed, and executes operation OP22 when the execution of the arithmetic instruction is completed. Otherwise, if the preceding arithmetic instruction is not being executed, in operation OP18, the instruction queue 30 initiates the timer 50. Next, in operation OP20, the instruction queue 30 waits for a notification of measurement completion from the timer 50, If the instruction queue 30 receives the notification of measurement completion, the instruction queue 30 executes operation OP22. In operation OP22, the instruction queue 30 issues the arithmetic instruction stored in the entry ENT in operation OP12 to the arithmetic unit 40 and completes the operations.

As described above, even in the embodiment illustrated in FIGS. 5 to 8, the effects similar to or the same as those of the embodiment illustrated in FIGS. 1 and 2 may be achieved. For example, even when the timings to receive arithmetic instructions in the processing cores 10 are the same, switching noise, which occurs when the arithmetic unit 3 starts to execute an arithmetic instruction, may be inhibited from superposition. This may reduce simultaneous switching noise. This enables a timing design to be made without setting an excessive timing margin, and may inhibit a decrease in the maximum operating frequency of the processor 100A. As a result, the degradation in the processing performance of the processor 100A may be inhibited.

In the embodiment illustrated in FIGS. 5 to 8, a predetermined time period is measured by the register 52 and the counter 54 provided in the timer 50, so that, for example, the predetermined time period may be measured using clock signals used in the processor 100A.

Figure 9:
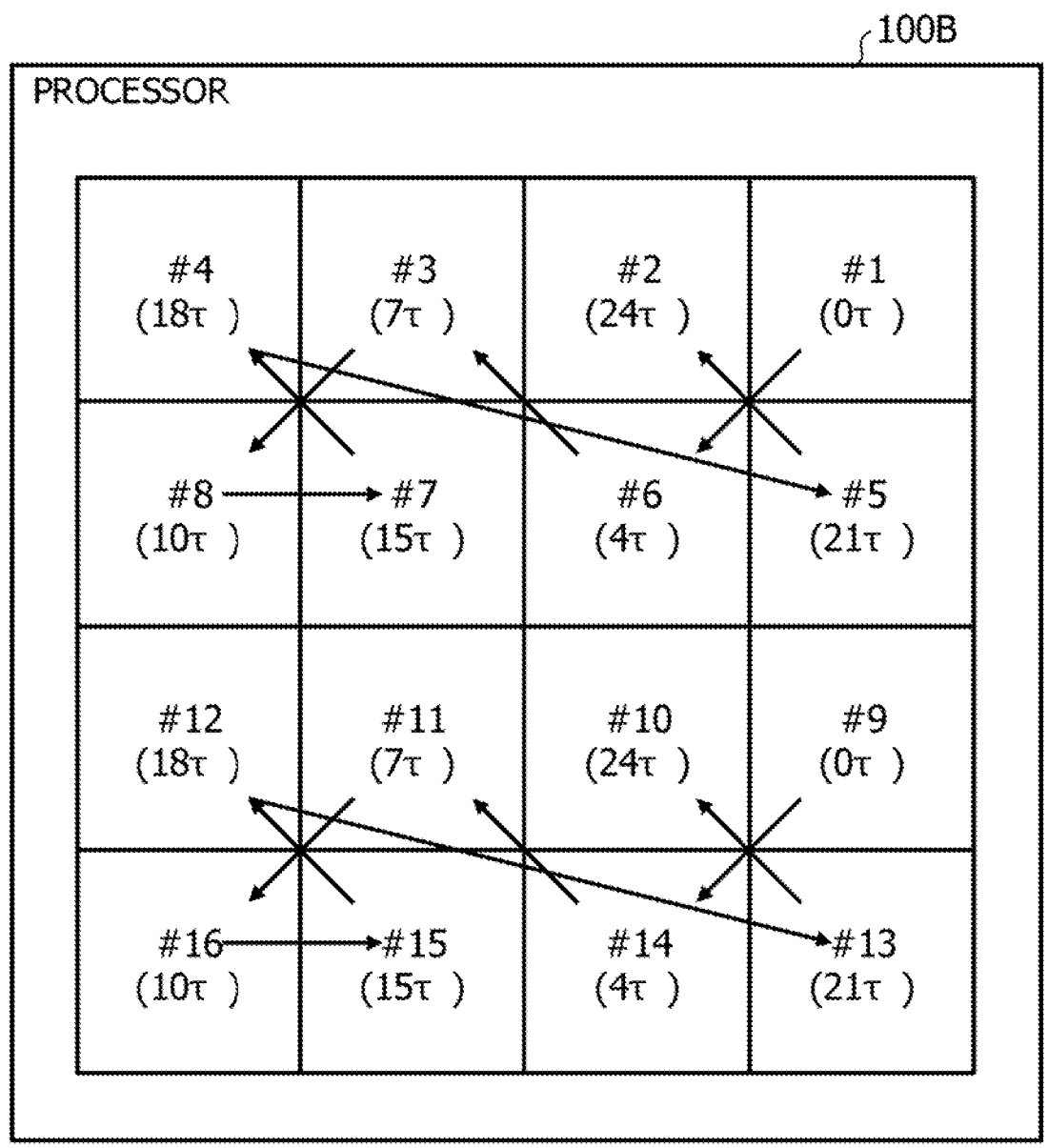
FIG. 9 is an explanatory diagram illustrating an example of an operation order of processing cores in a processor in another embodiment.

FIG. 9 illustrates an example of an operation order of the processing cores #1 to #16 in a processor 100B in another embodiment. The arrangement of the processing cores #1 to #16 of the processor 100B is the same as in FIG. 6. For example, in FIG. 9, a common arithmetic instruction, such as an SIMD arithmetic instruction, is assumed to be supplied at the same timing to 16 processing cores #1 to #16. The SIMD arithmetic instruction is an example of a parallel arithmetic instruction for executing operations in parallel by using a plurality of operators. The arithmetic instruction may be other than an SIMD arithmetic instruction. In this case, the arithmetic instructions supplied to the processing cores #1 to #16 may be of a plurality of types. The configuration of the processor 100B is the same as the configuration of the processor 100A illustrated in FIG. 5, except that the wait values WAIT supplied to the timers 50 are different.

In parentheses of each of the processing cores #1 to #16, the number of clock cycles between storage of an arithmetic instruction in the instruction queue 30 in which all the entries ENT are free and issuance of the arithmetic instruction to the arithmetic unit 40. The number of clock cycles corresponds to the wait value WAIT illustrated in FIG. 5, In the example illustrated in FIG. 9, the processor 100B includes a processing group including the processing cores #1 to #8 and a processing group including the processing cores #9 to #16. In each processing group, the wait value WAIT, which is used for counting until issuance of an arithmetic instruction, differs for each processing core. The number of processing groups may be one or may be four.

In this embodiment, the wait values WAIT of the processing cores # differ from one another in each processing group, and there are processing cores # whose wait values WAIT are common between the processing groups. For example, in the processing cores #1 and #9, an arithmetic instruction is issued to the arithmetic unit 40 based on the storage of the arithmetic instruction in the instruction queue 30 (WAIT1, WAIT9=0τ). In the processing cores #6 and #14, an arithmetic instruction is issued to the arithmetic unit 40 four clock cycles after the storage of the arithmetic instruction in the instruction queue 30 (WAIT6, WAIT9=4τ). In the processing cores #3 and #11, an arithmetic instruction is issued to the arithmetic unit 40 seven dock cycles after the storage of the arithmetic instruction in the instruction queue 30 (WAIT3, WAIT11=7τ).

In the processing cores #8 and #16, an arithmetic instruction is issued to the arithmetic unit 40 10 clock cycles after the storage of the arithmetic instruction in the instruction queue 30 (WAIT8, WAIT16=10τ). In the processing cores #7 and #15, an arithmetic instruction is issued to the arithmetic unit 40 15 clock cycles after the storage of the arithmetic instruction in the instruction queue 30 (WAIT7, WAIT15=15τ). In the processing cores #4 and #12, an arithmetic instruction is issued to the arithmetic unit 40 18 clock cycles after the storage of the arithmetic instruction in the instruction queue 30 (WAIT4, WAIT12=18τ).

In the processing cores #5 and #13, an arithmetic instruction is issued to the arithmetic unit 40 21 clock cycles after the storage of the arithmetic instruction in the instruction queue 30 (WAIT5, WAIT13=21τ). In the processing cores #2 and #10, an arithmetic instruction is issued to the arithmetic unit 40 24 clock cycles after the storage of the arithmetic instruction in the instruction queue 30 (WAIT2, WAIT10=24τ).

In such a manner, in the processing cores #1 to #8, based on arithmetic instructions supplied at the same timing, the instructions are sequentially executed with delays in the order of core numbers #1, #6, #3, #8, #7, #4, #5, and #2. Similarly, in the processing cores #9 to #16, based on arithmetic instructions supplied at the same timing, the arithmetic instructions are sequentially executed with delays in the order of core numbers #9, #14, #11, #16, #15, #12, #13, and #10. The delay time (wait value WAIT) for delaying execution of an arithmetic instruction and the order in which execution of an arithmetic instruction is delayed may be determined based on a simulation.

The order in which arithmetic instructions are started to be executed is set such that the arithmetic instructions are started to be executed sequentially in processing cores # positioned in a diagonal direction with respect to each other. For example, a processing core # positioned in a diagonal direction with respect to the current processing core # is preferentially set as a processing core that will next start execution of the arithmetic instruction. For example, in the processor 100B, power supply lines are arranged in the vertical direction and the horizontal direction in FIG. 9, and the power supply line in the vertical direction and the power supply line in the horizontal direction are coupled to each other at the intersections.

Therefore, by causing processing cores # positioned in a diagonal direction with respect to each other to sequentially operate, a power supply line coupled to the processing core # that has operated first, where switching noise occurs, may be made different from a power supply line coupled to the processing core # that operates secondly, where switching noise occurs. As a result, switching noise of a plurality of processing cores # directly coupled to a power supply line of interest arranged in one direction may be inhibited from superposition on the power supply line of interest, which may reduce simultaneous switching noise. The order of execution of arithmetic instructions is exemplary, and the arithmetic instructions may be executed in an order other than the order illustrated in FIG. 9. Another example of the order of execution of arithmetic instructions is illustrated in FIG. 11.

Figure 10:
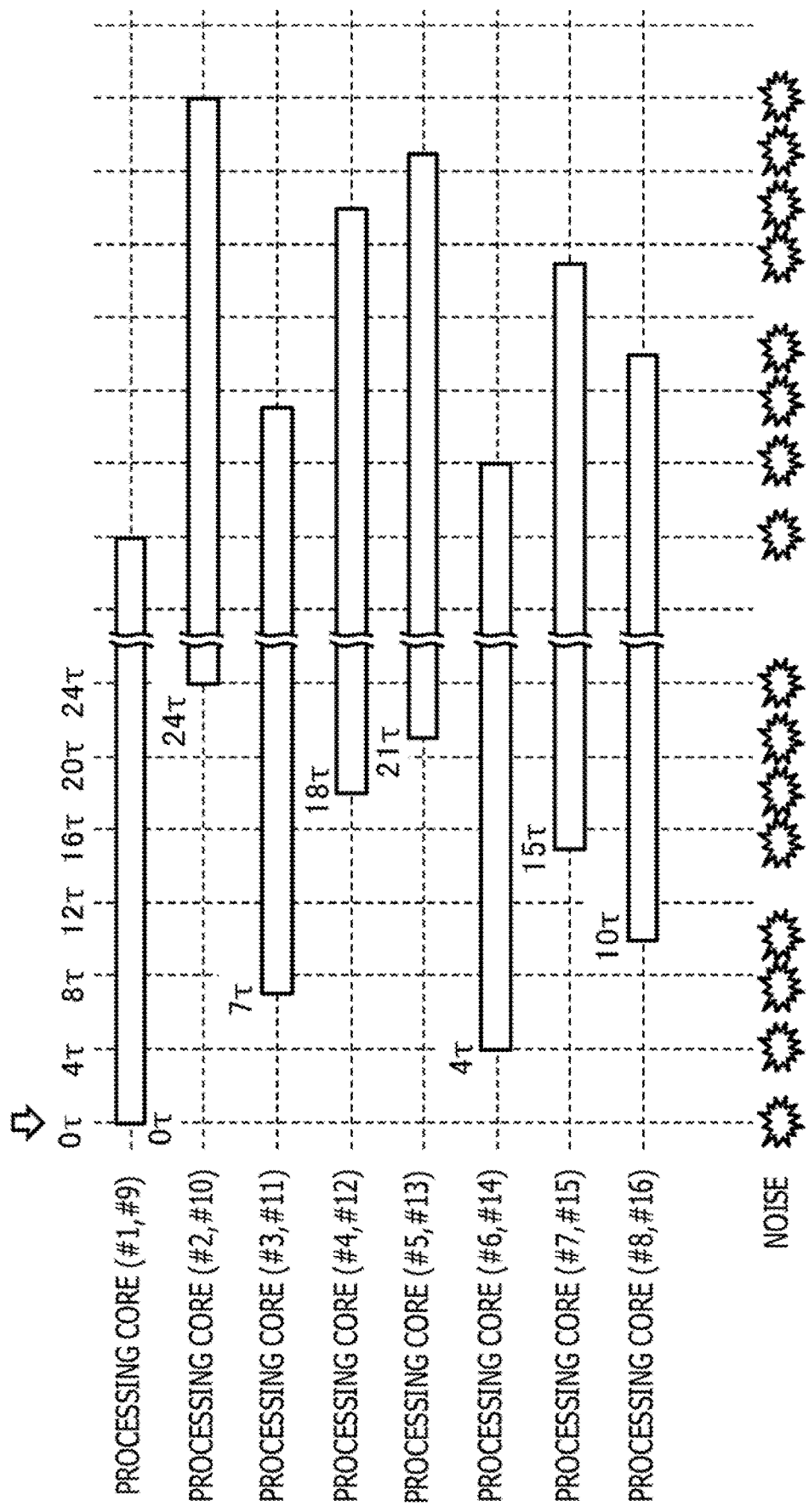
FIG. 10 is an explanatory diagram illustrating an example of operations of the processor illustrated in FIG. 9.

FIG. 10 illustrates an example of operations of the processor 100B illustrated in FIG. 9. In this embodiment, since execution of 16 arithmetic instructions is started in every two processing cores # and is complete in every two processing cores #, switching noise may be dispersed, which may reduce simultaneous switching noise. As a result, the design margin of a power supply design may be reduced.

The wait values WAIT of all the processing cores #1 to #16 are not made different from one another. The wait values WAIT of eight processing cores # are made different from one another in each processing group. Therefore, the delays in the timings to start execution of arithmetic instructions in accordance with the respective wait values WAIT may be minimized to inhibit superposition of switching noise. For example, in the case where the processing cores #1 to #16 are divided into four processing groups, the largest one of the delays in the timings to start execution of arithmetic instructions in accordance with the respective wait values WAIT may be approximately 12τ, half of the largest delay in FIG. 10. In contrast, in the case where the processing cores #1 to #16 are classified into one processing group, the largest one of the delays in the timings to start execution of arithmetic instructions in accordance with the respective wait values WAIT is approximately 48τ.

Figure 11:
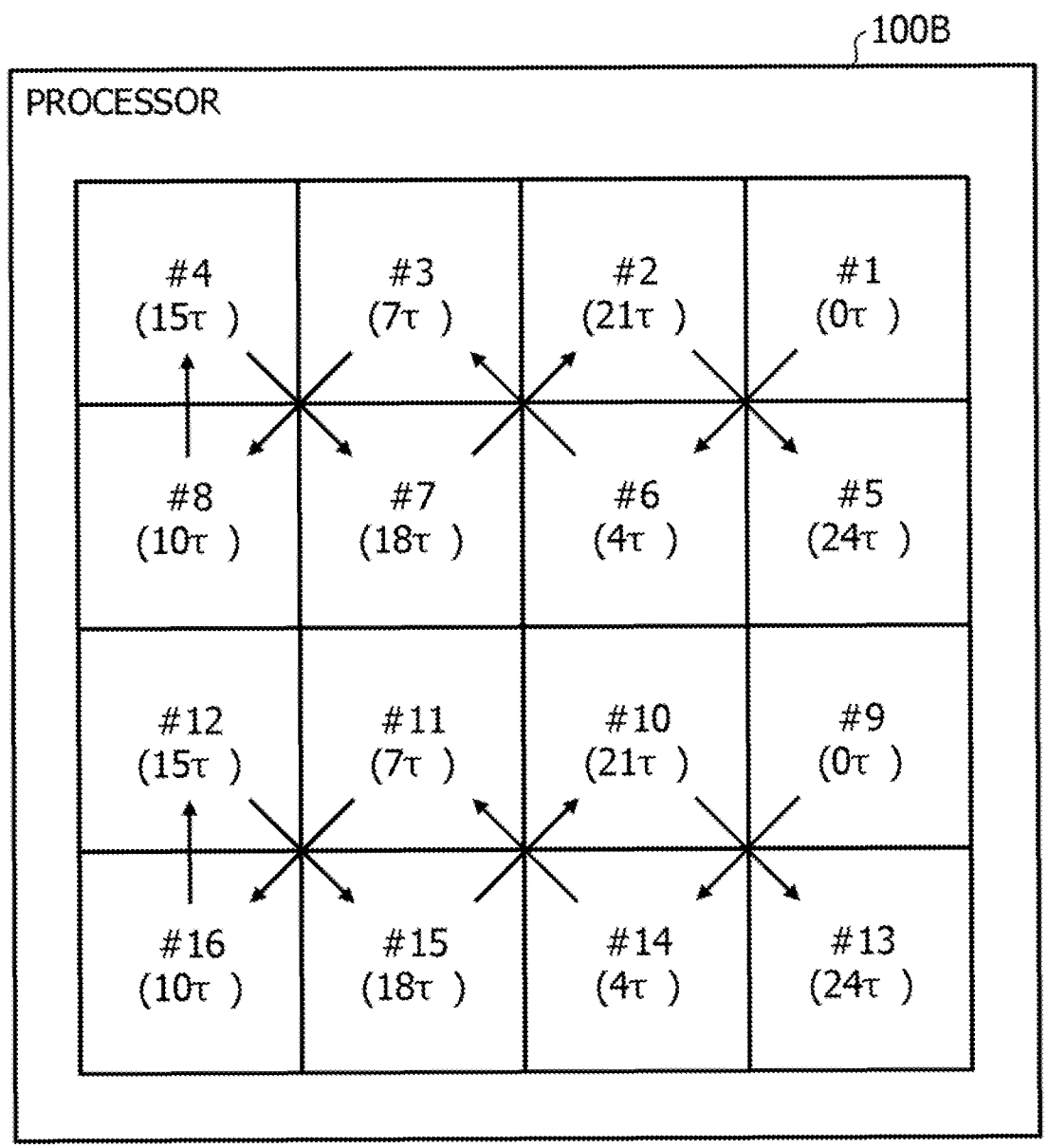
FIG. 11 is an explanatory diagram illustrating another example of the operation order of processing cores in the processor illustrated in FIG. 9.

FIG. 11 illustrates another example of the operation order of the processing cores #1 to #16 in the processor 100B illustrated in FIG. 9. The order in which arithmetic instructions are started to be executed is set such that the arithmetic instructions are started to be executed sequentially in processing cores # positioned in a diagonal direction with respect to each other. When a processing core # positioned in a diagonal direction with respect to the current processing core # has already started execution of an arithmetic instruction, a processing core # disposed in the vertical direction or in the horizontal direction with respect to the current processing core # is set so as to next start execution of an arithmetic instruction. For example, as is the case illustrated in FIG. 9, a processing core # positioned in a diagonal direction with respect to the current processing core # is preferentially set as a processing core # that will next start execution of the arithmetic instruction.

In FIG. 11, based on arithmetic instructions supplied at the same timing, the arithmetic instructions are sequentially executed with delays in the order of processing cores #1, #6, #3, #8, #4, #7, #2, and #5. Similarly, in the processing cores #9 to #16, based on arithmetic instructions supplied at the same timing, the arithmetic instructions are sequentially executed with delays in the order of processing cores #9, #14, #11, #16, #12, #15, #10, and #13.

Figure 12:
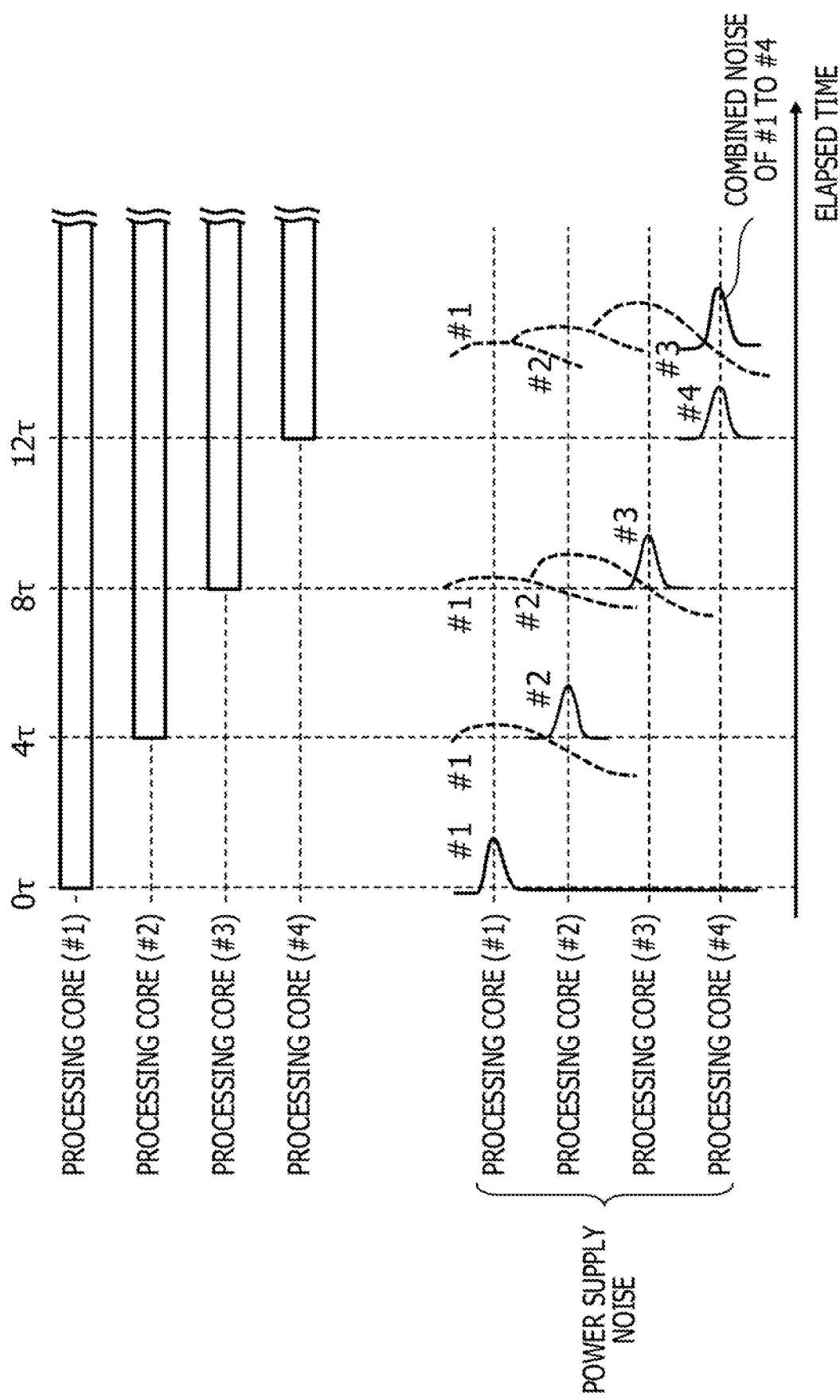
FIG. 12 is an explanatory diagram illustrating an example (comparison example) of operations of another processor.

FIG. 12 illustrates an example (comparison example) of operations of another processor. In the example illustrated in FIG. 12, the processing cores #1, #2, #3, and #4 in the horizontal direction of FIG. 9 sequentially start to execute arithmetic instructions. In this case, superposition of switching noise that has occurred sequentially in the processing cores #1, #2, #3, and #4 occurs on a power supply line arranged along the arrangement direction of the processing cores #1 to #4, resulting in occurrence of combined noise.

Figure 13:
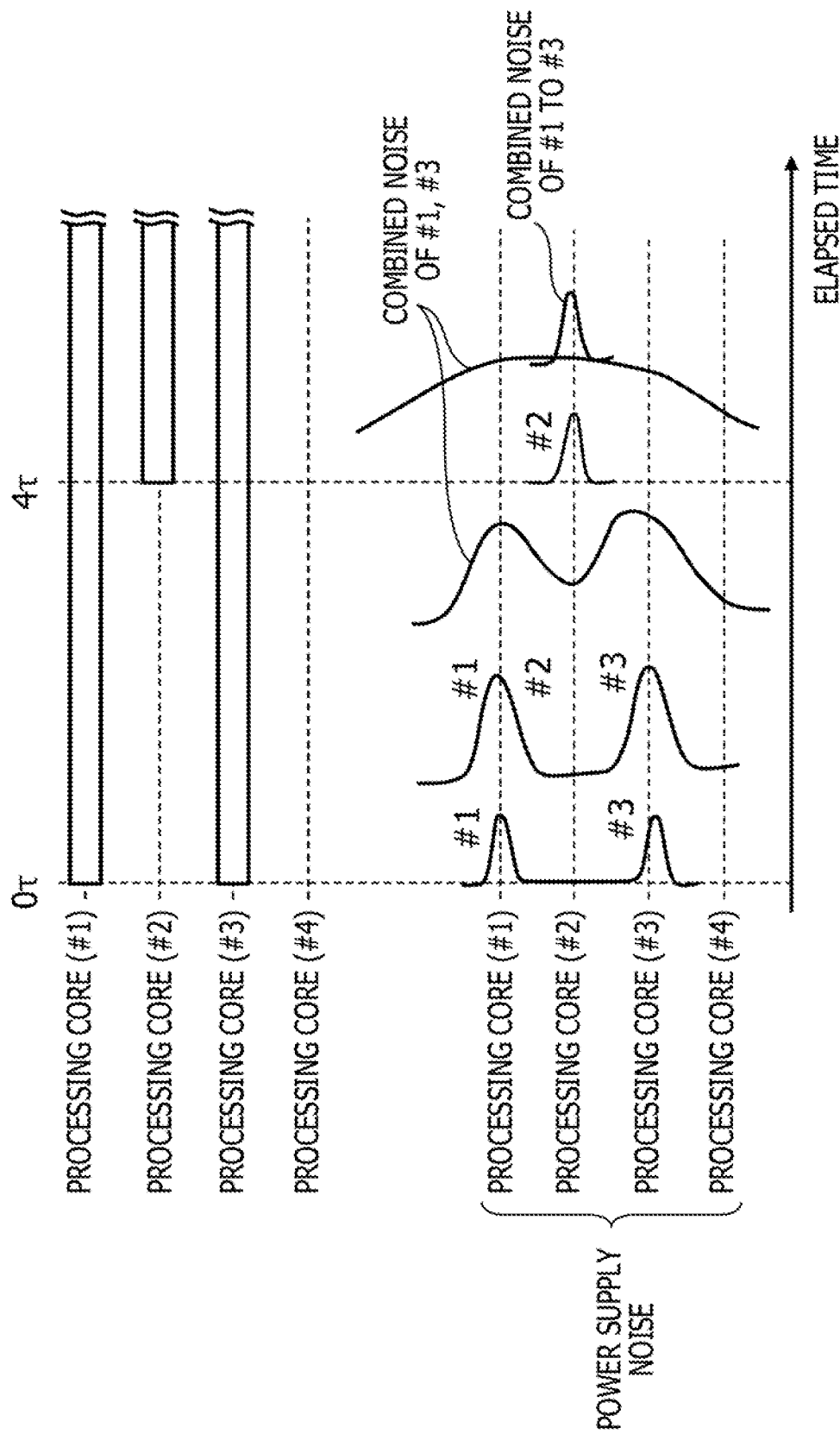
FIG. 13 is an explanatory diagram illustrating another example (comparison example) of operations of the other processor.

FIG. 13 illustrates another example (comparison example) of operations of the other processor. In the example illustrated in FIG. 13, the processing cores #1 and #3 arranged in the horizontal direction of FIG. 9 start to execute arithmetic instructions at the same timing (0τ), and the processing core #2 arranged between the processing cores #1 and #3 starts execution of an arithmetic instruction a predetermined time period (4τ) later. The processing core #4 does not execute an arithmetic instruction. In this case, switching noise that has occurred in the processing cores #1 and #3 propagates toward the processing core #2 on a power supply line in the arrangement direction of the processing cores #1 to #4, and superposition of this switching noise and the switching noise that has occurred in the processing core #2 occurs, resulting in occurrence of combined noise.

As described above, in the embodiment illustrated in FIGS. 9 to 11, the effects similar to or the same as those in the foregoing embodiments may be achieved. Even when the timings to receive arithmetic instructions in the processing cores # are the same, the processing cores # positioned in a diagonal direction with respect to each other sequentially operate. Thereby, switching noise of a plurality of processing cores # may be inhibited from superposition on a power supply line arranged in one direction. As a result, simultaneous switching noise may be reduced and the design margin of a power supply design may be reduced. By making, for each processing group including a predetermined number of processing cores #, the wait values WAIT of the processing cores # different from one another, the delays in the timings to start execution of arithmetic instructions in accordance with the respective wait values WAIT may be minimized to inhibit superposition of switching noise.

Figure 14:
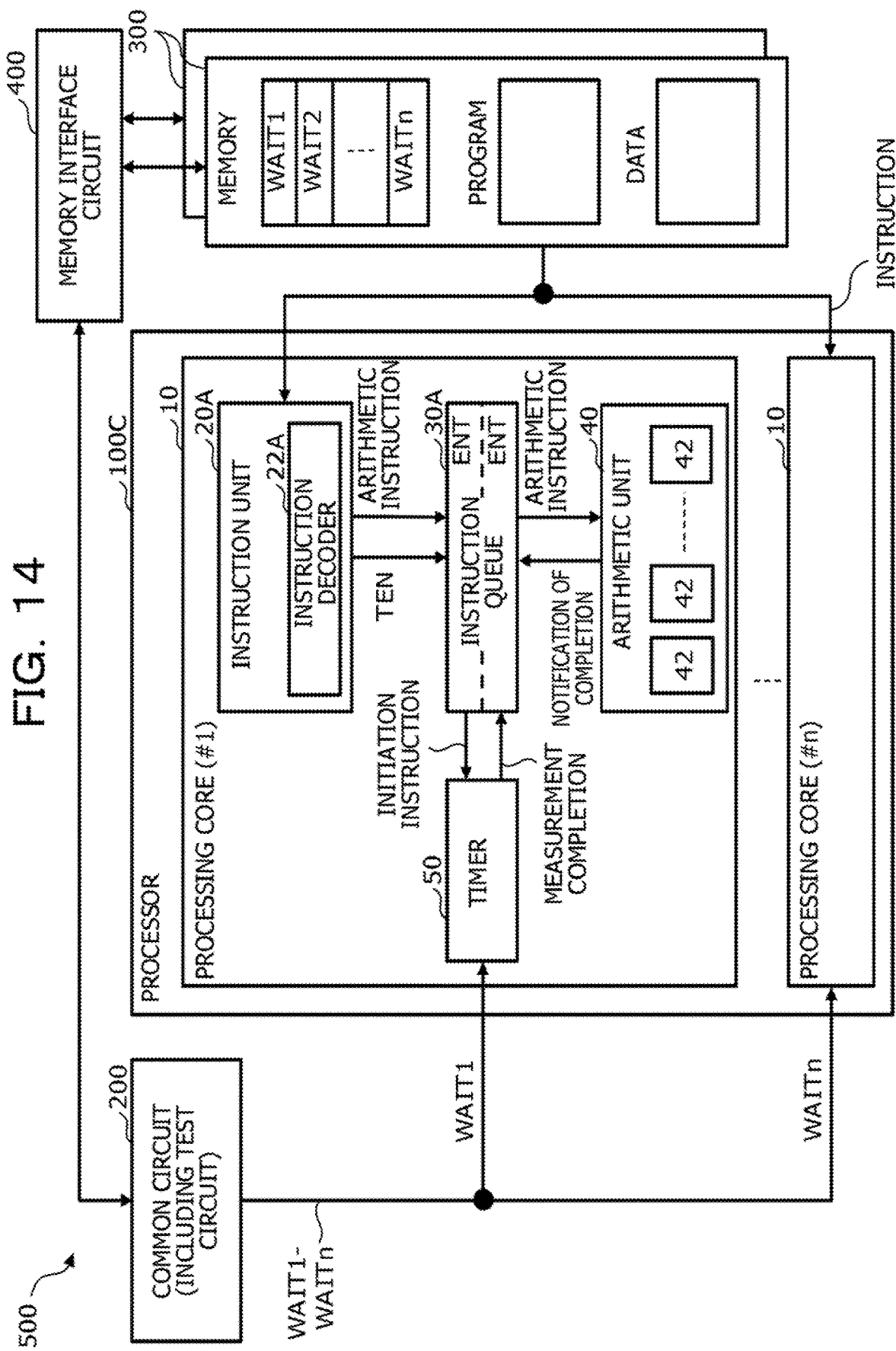
FIG. 14 is a block diagram illustrating an example of a system including an arithmetic processing device in another embodiment.

FIG. 14 illustrates an example of the system 500 including a processor 100C in another embodiment. Components similar to or the same as those illustrated in FIG. 5 are denoted by the same reference numerals and detailed description thereof is omitted. As is the case illustrated in FIG. 5, the system 500 illustrated in FIG. 14 includes the processor 100C, the common circuit 200, the memories 300, and the memory interface circuit 400.

Each processing core 10 of the processor 100C includes an instruction unit 20A instead of the instruction unit 20 in FIG. 1 and an instruction queue 30A instead of the instruction queue 30 in FIG. 1. As described with reference FIG. 1, the arithmetic unit 40 includes the operators 42 of a plurality of types, such as a floating-point operator, a fixed-point operator, and a logic operator.

The instruction unit 20A includes an instruction decoder 22A that decodes an arithmetic instruction received from the memory 300. The instruction decoder 22A causes the decoded arithmetic instruction to be stored in the instruction queue 30A and outputs a timer enable signal TEN in accordance with the type of the decoded arithmetic instruction.

For example, when the instruction decoder 22A decodes an arithmetic instruction to be executed by the operator 42 whose power consumption is greater than or equal to a predetermined amount, the instruction decoder 22A outputs a valid-level timer enable signal TEN. When the instruction decoder 22A decodes an arithmetic instruction to be executed by the operator 42 whose power consumption is less than the predetermined amount, the instruction decoder 22A outputs an invalid-level timer enable signal TEN. When the instruction decoder 22A decodes a branch instruction and a memory access instruction, the instruction decoder 22A may output an invalid-level timer enable signal TEN.

For example, in this embodiment, when, in each processing core 10, the power supply current at the time of start of execution of an arithmetic instruction is predicted to be greater than or equal to a prescribed value and the switching noise is predicted to be greater than or equal to a predetermined value, a valid-level timer enable signal TEN is output. Otherwise, when, in each processing core 10, the power supply current at the time of start of execution of an arithmetic instruction is predicted to be less than the prescribed value and the switching noise is predicted to be less than the predetermined value, an invalid-level timer enable signal TEN is output. For example, when superposition of switching noise does not affect the operations of the processor 100C, an invalid-level timer enable signal TEN is output.

The power supply current is determined in advance for each operator 42 by a simulation or the like and, from the determined power supply current, the power consumption of the operator 42 is determined. Whether to set the timer enable signal TEN to a valid level is determined based on the power consumption of each operator 42. Whether to set the timer enable signal TEN to a valid level may be determined based on the power supply current of each operator 42.

For example, the operator 42 whose power consumption is greater than or equal to a predetermined amount is an SIMD operator that executes an SIMD arithmetic instruction. The operator 42 whose power consumption is greater than or equal to a predetermined amount may be a floating-point operator and the operators 42 whose power consumptions are less than the predetermined amount may be a fixed-point operator and a logic operator. Alternatively, the operators 42 whose power consumptions are greater than or equal to a predetermined amount may be a floating-point multiplier, a floating-point divider, and a floating-point product-sum operator, and the operators 42 whose power consumptions are less than the predetermined amount may be a floating-point adder, a fixed-point operator, and a logic operator. The operators 42 whose power consumptions are greater than or equal to a predetermined amount may be a floating-point multiplier, a floating-point divider, a floating-point product-sum operator, a fixed-point multiplier, a fixed-point divider, and a fixed-point product-sum operator.

If the instruction queue 30A in a state in which all of the entries ENT are free receives an arithmetic instruction to be stored in the entry ENT and a valid timer enable signal TEN, the instruction queue 30A issues an initiation instruction to the timer 50. When the instruction queue 30A receives a notification of measurement completion from the timer 50, the instruction queue 30A issues the arithmetic instruction held in the entry ENT to the arithmetic unit 40.

Otherwise, if the instruction queue 30A in a state in which all of the entries ENT are free receives an arithmetic instruction to be stored in the entry ENT and an invalid timer enable signal TEN, the instruction queue 30A inhibits issuance of an initiation instruction to the timer 50. Without initiating the timer 50, the instruction queue 30A issues the arithmetic instruction stored in the entry ENT to the arithmetic unit 42.

If the instruction queue 30A in a state in which any of the entries ENT is empty receives an arithmetic instruction while any of the operators 42 is executing an arithmetic instruction, the instruction queue 30A inhibits initiation of the timer 50 regardless of the level of the timer enable signal TEN. Based on completion of the arithmetic instruction executed by any of the operators 42, the instruction queue 30A issues the arithmetic instruction held in the entry ENT to a predetermined operator 42.

Thus, operations as illustrated in FIG. 7 are performed when a valid timer enable signal TEN is output from the instruction decoder 22A, whereas operations as illustrated in FIG. 3 are performed when an invalid timer enable signal TEN is output from the instruction decoder 22A.

Accordingly, when switching noise that has occurred by execution of an arithmetic instruction is greater than or equal to a prescribed value, the timer 50 is initiated, so that superposition of switching noise may be inhibited. In contrast, when switching noise that has occurred by execution of an arithmetic instruction is small, the initiation of the timer 50 is inhibited, so that execution of the arithmetic instruction may be started by a plurality of processing cores 10 at the same timing. In this case, the start of execution of the arithmetic instruction is not delayed, and therefore a decrease in processing efficiency may be inhibited.

The instruction queue 30 may stagger the operation start timings of the operators 42 in the arithmetic unit 40 from each other. In this case, each processing core 10 includes a plurality of timers 50 and the instruction queue 30 initiates the timer 50 for each operator 42 that executes an arithmetic instruction.

As described above, in the embodiment illustrated in FIG. 14, the effects similar to or the same as those in the foregoing embodiments may be achieved. In this embodiment, in accordance with the magnitude of switching noise that occurs for each arithmetic instruction, the decision of whether to delay the start of execution of the arithmetic instruction may be changed. Thus, when even superposition of switching noise does not affect the operations of the processor 100C, execution of arithmetic instructions may be started at the same timing by a plurality of processing cores 10, which may inhibit a decrease in processing efficiency.

Features and advantages of the embodiments would be apparent from the foregoing detailed description. The scope of claims is intended to cover the features and advantages of the embodiments as described above without departing from the spirit and scope of the claims. Any person having ordinary knowledge in the art may readily conceive of any improvements and changes. Accordingly, there is no intention to limit the scope of the inventive embodiments to those described above, and it is possible to rely on appropriate modifications and equivalents included in the scope disclosed in the embodiments.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention,

What is claimed is:

1. An arithmetic processing device comprising:
a plurality of arithmetic processing circuitry,
each of the plurality of arithmetic processing circuitry including
an instruction hold circuit configured to hold an arithmetic instruction,
an arithmetic circuit configured to execute an arithmetic instruction issued from the instruction hold circuit, and
a measurement circuit configured to measure a time,
the instruction hold circuit is configured to perform first processing in response to a first arithmetic instruction held in the instruction hold circuit at a time in which the arithmetic circuit is not executing other arithmetic instructions, the first processing being configured to:
cause the measurement circuit to initiate the measurement of the time; and
issue, in response to the measured time being equal to or greater than a threshold, the held first arithmetic instruction to the arithmetic circuit, and
the threshold used in each of the plurality of arithmetic processing circuitry is different in value between at least two of the plurality of arithmetic processing circuitry,
the instruction hold circuit is configured to perform second processing in response to the first arithmetic instruction held in the instruction hold circuit at a time in which the arithmetic circuit is executing any of the other arithmetic instructions, the second processing being configured to issue, without the measurement of the time, the first arithmetic instruction to the arithmetic circuit in response to a completion of the executing of the any of the other arithmetic instruction.

2. The arithmetic processing device according to claim 1, wherein
the instruction hold circuit includes a plurality of entries, each of the plurality of entries being configured to hold the arithmetic instruction,
the instruction hold circuit is configured to
when none of the plurality of entries holds the arithmetic instruction, determine that the arithmetic circuit is not executing the other arithmetic instructions, and
when at least any one of the plurality of entries holds the arithmetic instruction, determine that the arithmetic circuit is executing any of the other arithmetic instructions, and
the arithmetic instruction held in each of the plurality of entries is discarded in response to a completion of the executing of the arithmetic instruction by the arithmetic circuit.

3. The arithmetic processing device according to claim 1, wherein
the plurality of arithmetic processing circuitry are arranged in a matrix, and
the predetermined time period in each of the plurality of arithmetic processing circuitry is adjusted such that a first arithmetic group from among the plurality of arithmetic processing circuitry initiates the executing of the first arithmetic instruction in a diagonal direction with respect to each other, the first arithmetic group being arithmetic processing circuits positioned in the diagonal direction from among the plurality of arithmetic processing circuitry arranged in the matrix.

4. The arithmetic processing device according to claim 1, wherein
the plurality of arithmetic processing circuitry are divided into a plurality of groups, each of the plurality of groups including a predetermined number of arithmetic processing circuitry, and
the threshold used in each of the plurality of arithmetic processing circuitry is differ different in value between at least two of the predetermined number of arithmetic processing circuitry in each of the plurality of groups.

5. The arithmetic processing device according to claim 1, wherein
the instruction hold circuit is configured to perform third processing in response to a parallel arithmetic instruction held in the instruction hold circuit at a time in which the arithmetic circuit is not executing other parallel arithmetic instructions, the parallel arithmetic instruction being an arithmetic instruction for executing a plurality of arithmetic instructions in parallel by using each arithmetic circuit of two or more of the plurality of arithmetic processing circuitry, the third processing being configured to cause the measurement circuit to initiate the measurement of the predetermined time period, and
the instruction hold circuit is configured to perform fourth processing in a case where the instruction hold circuit holds the first arithmetic instruction other than the parallel arithmetic instruction, the fourth processing being configured to
issue, without the measurement of the time, the first arithmetic instruction to the arithmetic circuit regardless of whether the arithmetic circuit is executing the other arithmetic instructions.

6. The arithmetic processing device according to claim 1, wherein
the arithmetic circuit included in each of the plurality of arithmetic processing circuitry includes a plurality of types of operators, and
the instruction hold circuit is configured to perform fifth processing in response to the first arithmetic instruction held in the instruction hold circuit at a time in which the arithmetic circuit is not executing the other arithmetic instructions, the first arithmetic instruction being an arithmetic instruction to be executed by a first operator, the first operator being one of the plurality of types of operators and being an operator whose power consumption is greater than or equal to a predetermined amount, the fifth processing being configured to:
cause the measurement circuit to initiate the measurement of the time; and
issue, in response to the measured time being equal to or greater than a threshold, the first arithmetic instruction to the first operator, and
the instruction hold circuit is configured to perform sixth processing in response to a second arithmetic instruction held in the instruction hold circuit, the second arithmetic instruction being an arithmetic instruction to be executed by a second operator from among the plurality of types of operators, the second operator being one of the plurality of types of operators and being an operator whose power consumption is less than the predetermined amount, the sixth processing being configured to
issue, without the measurement of the time, the second arithmetic instruction to the second operator.

7. The arithmetic processing device according to claim 1, wherein
the measurement circuit includes a storage circuit and a counter, the storage circuit being configured to store a counter value corresponding to the time, and
the measurement circuit is configured to measure the time by causing the counter to count a counter value stored in the storage circuit.

8. A method of controlling an arithmetic processing device, the arithmetic processing device including a plurality of arithmetic processing circuitry, each of the arithmetic processing circuitry including an instruction hold circuit configured to hold an arithmetic instruction, an arithmetic circuit configured to execute an arithmetic instruction issued from the instruction hold circuit, and a measurement circuit configured to measure a time, the method being implemented by the instruction hold circuit, the method comprising:
performing first processing in response to a first arithmetic instruction held in the instruction hold circuit at a time in which the arithmetic circuit is not executing other arithmetic instructions, the first processing being configured to cause the measurement circuit to initiate the measurement of the time;
issuing, in response to the measured time being equal to or greater than a threshold, the held first arithmetic instruction to the arithmetic circuit, the threshold used in each of the plurality of arithmetic processing circuitry measured by the measurement circuit is different in value between at least two of the plurality of arithmetic processing circuitry;
performing second processing in response to the first arithmetic instruction held in the instruction hold circuit at a time in which the arithmetic circuit is executing any of the other arithmetic instructions, the second processing being configured to issue, without the measurement of the time, the first arithmetic instruction to the arithmetic circuit in response to a completion of the executing of the any of the other arithmetic instruction.

\* \* \* \* \*